United States Patent [19]

Szlaga et al.

[11] Patent Number: 4,944,779
[45] Date of Patent: * Jul. 31, 1990

[54] VAPOR RECOVERY SYSTEM

[75] Inventors: Emil Szlaga; Robert S. Harris; Robert H. Thompson, all of Connersville, Ind.

[73] Assignee: Stant Inc., Connersville, Ind.

[ * ] Notice: The portion of the term of this patent subsequent to Mar. 28, 2006 has been disclaimed.

[21] Appl. No.: 334,724

[22] Filed: Apr. 7, 1989

Related U.S. Application Data

[63] Continuation-in-part of Ser. No. 236,798, Aug. 26, 1988, Pat. No. 4,836,835, which is a continuation-in-part of Ser. No. 106,632, Oct. 8, 1987, Pat. No. 4,816,045, which is a continuation-in-part of Ser. No. 846,081, Mar. 31, 1986, Pat. No. 4,770,677.

[51] Int. Cl.$^5$ ............................................. B01D 53/00
[52] U.S. Cl. ...................................... 55/168; 55/387; 123/519; 137/613; 220/86 R; 220/85 VS; 220/85 VR
[58] Field of Search .................. 55/88, 168, 387, 182; 141/286, 44, 45, 302; 220/85 VR, 85 VS, 86 R; 137/613; 123/516, 519

[56] References Cited

U.S. PATENT DOCUMENTS

| | | | |
|---|---|---|---|
| 4,706,708 | 11/1987 | Fornato et al. | 220/86 R |
| 4,809,863 | 3/1989 | Woodcock et al. | 220/85 VR X |
| 4,816,045 | 3/1989 | Szlaga et al. | 55/168 |

Primary Examiner—Bernard Nozick
Attorney, Agent, or Firm—Barnes & Thornburg

[57] ABSTRACT

A vapor handling system includes an overfill shut-off valve to provide protection for the canister from exposure to liquid fuel during a tank overfill condition which may be caused by a malfunction of a refueling nozzle. A system is provided for automatically assisting in opening the overfill shut-off valve at the conclusion of the tank refilling process to reestablish fluid communication between a fuel tank and a vapor recovery canister so that adequate fuel vapor venting from the tank to the canister can occur. The overfill shut-off valve is configured to block such fluid communication by closing a venting passageway interconnecting the tank and the canister.

23 Claims, 10 Drawing Sheets

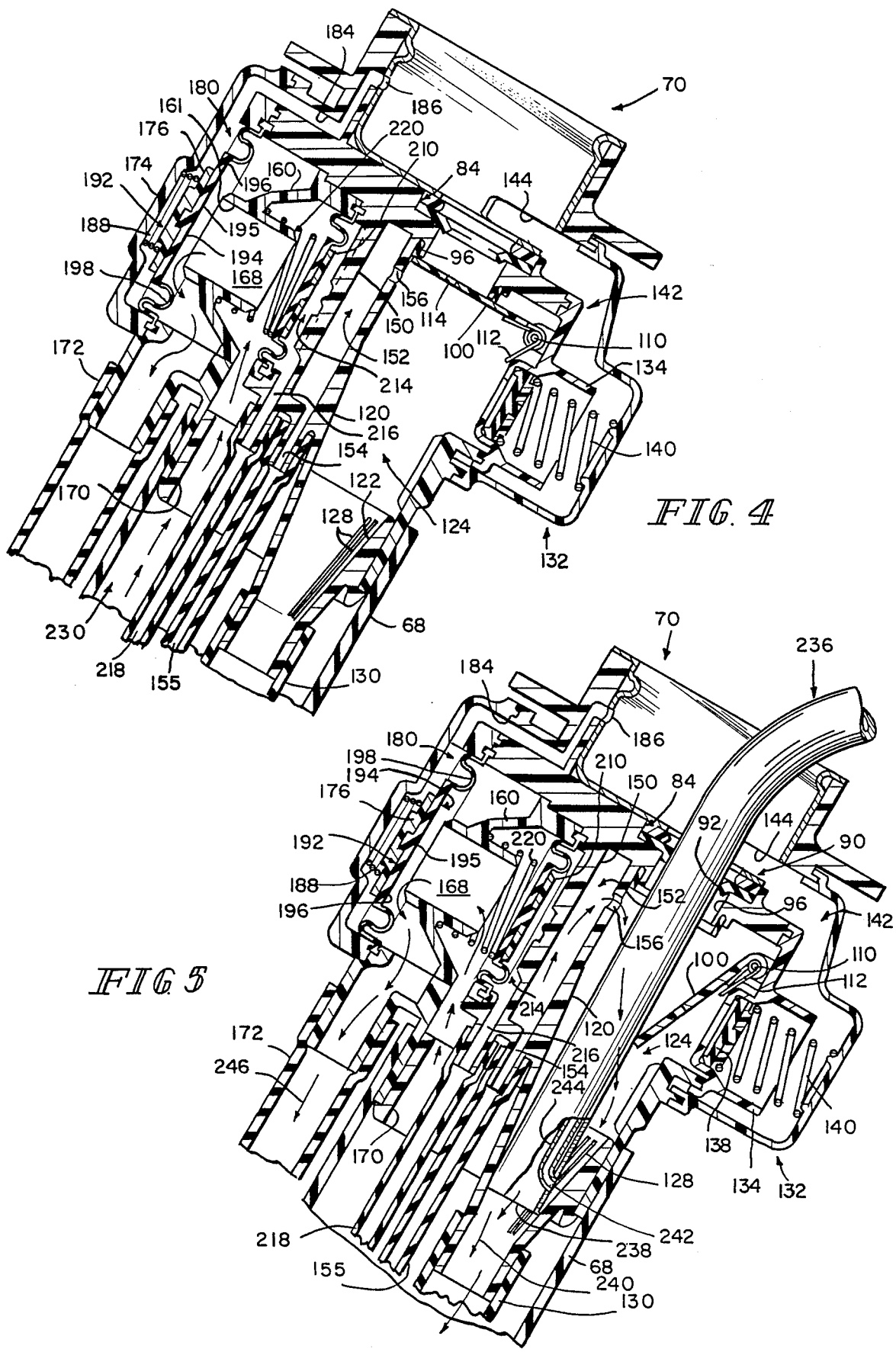

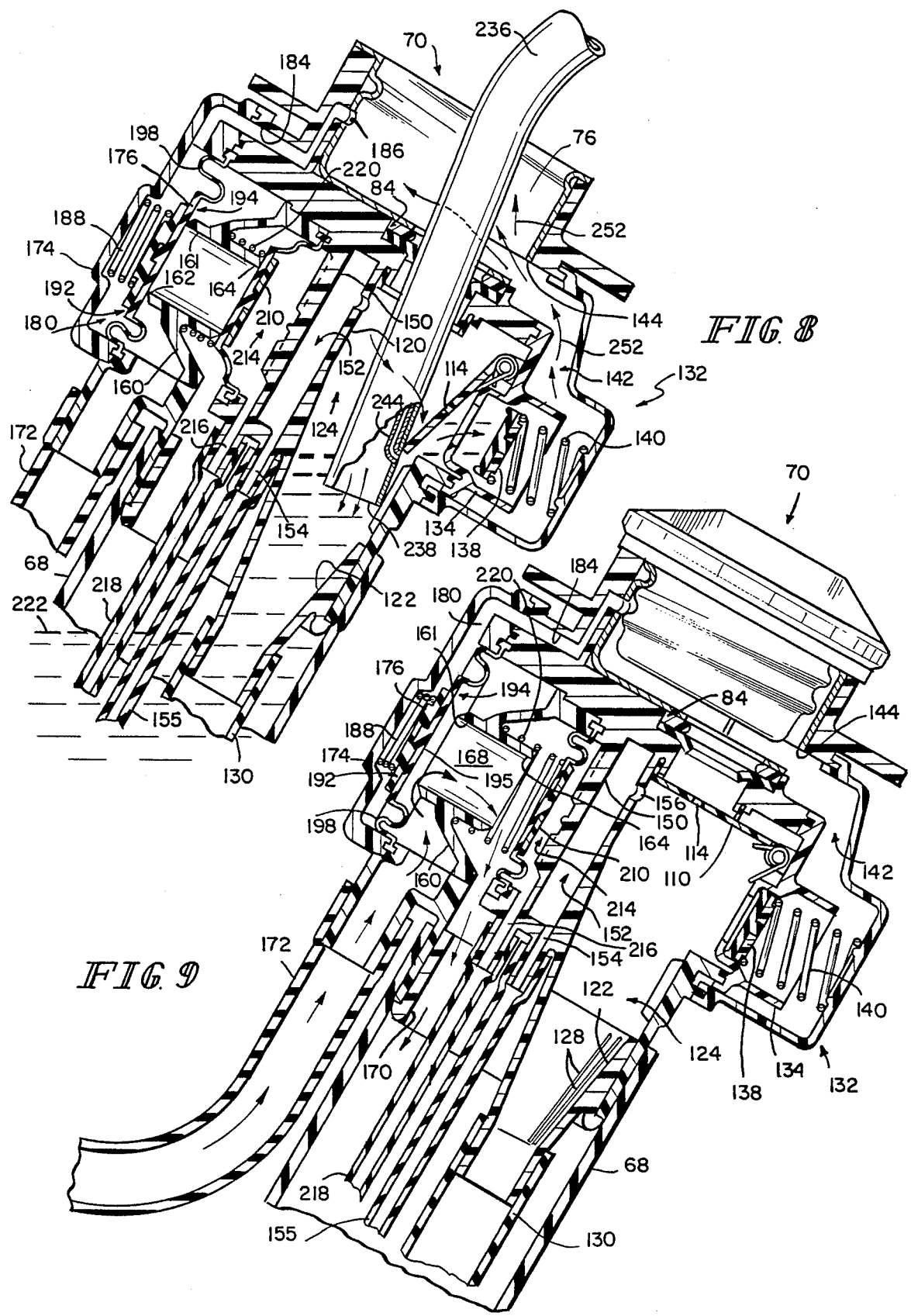

VAPOR RECOVERY SYSTEM

BACKGROUND AND SUMMARY OF THE INVENTION

This application is a continuation-in-part of co-pending application Ser. No. 07/236,798, filed Aug. 26, 1988 (now U.S. Pat. No. 4,836,835), which is a continuation-in-part of co-pending application Ser. No. 07/106,632, filed Oct. 8, 1987 (now U.S. Pat. No. 4,816,045), which is a continuation-in-part of co-pending application Ser. No. 06/846,081, filed Mar. 31, 1986 (now U.S. Pat. No. 4,770,677).

The present invention relates to a vapor handling system which controls vapor in the fuel system or vapor created during filling of the fuel tank or both to prevent the vapor from escaping untreated to the atmosphere during the filling process. More particularly, the present invention relates to a vapor handling system including an overfill shut-off valve in a vent passage that is closable to protect a vapor recovery canister coupled to the fuel tank from excessive exposure to liquid fuel in response to fuel-dispensing nozzle shut-off failure and means for reestablishing fluid communication between the tank and the canister after filling is completed by regulating pressure in the vent passage so that the overfill shut-off valve opens in due course.

It is now understood that a significant quantity of fuel vapor is permitted to escape to the atmosphere during the refueling of motor vehicles. Conventional filler necks and fuel tank assemblies on vehicles are not configured to control this escape of fuel vapor during the refilling process. Generally, the filler neck of a vehicle has a diameter substantially greater than the diameter of the fuel dispensing nozzle. Because of the relatively large diameter of the filler neck with respect to the fuel dispensing nozzle, the fuel vapor created by fuel dispensed into the fuel tank through the filler neck escapes out through the filler neck and to the atmosphere substantially continuously during the filling operation. This creation of fuel vapor during the refueling process has recently been recognized as a major contributor to pollution of the atmosphere, especially with newer, more volatile blends of vehicle fuel.

Attempts have been made to control this escape of fuel vapor during the filling process by adapting the service station fuel dispensing nozzle to include a vapor recovery portion which captures the escaping fuel vapor and prevents the fuel vapor from escaping into the atmosphere. Such conventional methods of capturing the escaping fuel vapor have generally proved unsatisfactory because of the complexity of the system and because of relatively poor vapor capturing characteristics of the system. It is generally recognized that for satisfactory fuel vapor control during refilling, a system must be provided which is on-board the vehicle for capturing and controlling such fuel vapor generated during refilling. Ideally, such a system would work automatically without any operator supervision.

Another problem with conventional filler neck and fuel tank assemblies is that it is sometimes extremely difficult to achieve accurate filling levels because of the configuration of the filler neck, and further because all conventional filler neck and fuel tank assemblies rely upon fuel splashed back upon the fuel dispensing nozzle to shut off the fuel nozzle. Relying upon fuel splash back provides generally unsatisfactory fill level consistency because such fuel splash back is dependent upon a number of factors. Such factors include the flow rate of the nozzle, the configuration and routing of the filler neck, and the general orientation of the filler neck with the fuel tank, as well as fuel dispensing nozzle sensitivity. Because of such inconsistency in achieving accurate fill levels, it would be advantageous to provide a more accurate nozzle shut-off control which would ideally permit the fuel tank to be filled to accurate, consistent fill levels during each refueling operation.

One object of the present invention is to provide a fuel vapor handling system which controls the escape of fuel vapor created during the tank refilling process, with the system mounted on-board the vehicle.

Another object of the present invention is to provide a vapor handling system which is automatically activated during refueling, and which is automatically disabled whenever refueling ceases.

Yet another object of the present invention is to provide a vapor handling system which uses overfill shut-off valve means to provide protection for the canister from exposure to liquid fuel during a tank overfill condition which may be caused by a malfunction of a refueling nozzle.

Yet another object of the present invention is to provide a system for automatically assisting in opening the overfill shut-off valve means at the conclusion of the tank refilling process to reestablish fluid communication between a fuel tank and a vapor recovery canister so that adequate fuel vapor venting from the tank to the canister can occur. The overfill shut-off valve means is configured to block such fluid communication by closing a venting passageway interconnecting the tank and the canister. The valve means is actuated in response to failure of the fuel-dispensing nozzle to shut off at the proper time during the tank refilling process so that the canister is protected from excessive exposure to liquid fuel otherwise discharged from the tank through the venting passageway.

According to the present invention, a system is provided for recovering fuel vapors discharged from a vehicle fuel system during refueling. The vehicle fuel system includes a fuel tank having a filler neck and canister means for processing fuel vapor. The system includes means for conducting fuel vapor between the fuel tank and the canister means and first valve means for selectively blocking flow of fuel vapor through the conducting means. The first valve means is movable in the conducting means between a flow-blocking position and flow-delivery positions. Upon movement of the first valve means to its flow-blocking position, it divides the conducting means into an inner region communicating with the fuel tank and an outer region communicating with the canister means.

First passageway means is provided in the system for communicating a closing pressure from the fuel tank to the first valve means to move the first valve means to its flow-blocking position. The system also includes means for selectively venting the first passageway means to the atmosphere to dissipate any closing pressure therein. Pressure generated by fuel vapor in the fuel tank having a magnitude in excess of a predetermined threshold level and communicated to the first valve means via the inner region of the conducting means applies a load to the first valve means. This load is sufficient to move the first valve means from its flow-blocking position to a flow-delivery position once the first passageway means has been vented to relieve the closing pressure therein, thereby permitting pressurized fuel vapor to flow from the fuel tank to the canister means through the conducting means.

The system further includes second passageway means for communicating fuel vapor from the first passageway means to the inner region of the conducting means while the first valve means is in its flow-blocking position. The second passageway means is situated outside of the fuel tank filler neck. In one preferred embodiment, the first valve means is formed to include the second passageway means.

In preferred embodiments, the conducting means includes an inner surface defining a venting aperture and providing a valve seat surrounding the venting aperture. The first valve means includes a venting valve positioned at a junction of the conducting means and the first passageway means to provide a common boundary between the conducting means and the first passageway means so that the venting valve receives pressure communicated via the first passageway means and pressure communicated via the conducting means without interconnecting the conducting means and the first passageway means in fluid communication at the junction. The first valve means also includes spring means for yieldably biasing the venting valve against the valve seat to close the venting aperture. Illustratively, the second passageway means extends through the venting valve to interconnect the first passageway means and the conducting means.

In preferred embodiments, the system further includes second valve means for selectively regulating flow of fuel vapor through the second passageway means. The second valve means is desirably coupled to the first valve means. In another embodiment, the second passageway means is configured to define means for discharging a substantially constant volumetric flow rate of fuel vapor from the first passageway means to the interior region of the conducting means as long as the pressure of said fuel vapor remains substantially constant.

Illustratively, overfill sensor means is provided in the inner region for blocking flow of liquid fuel and fuel vapor from the fuel tank to the canister means through the conducting means upon accumulation of a predetermined volume of liquid fuel in the fuel tank in excess of a predetermined threshold level. The overfill sensor means desirably includes a shut-off valve mounted in the inner region for movement between an opened and closed position and control means for moving the shut-off valve to its closed position upon accumulation of said predetermined volume of liquid fuel in the fuel tank. The second passageway means is configured to communicate pressurized fuel vapor from the first passageway means to the overfill sensor means so that such pressurized fuel vapor is permitted to apply a force to the shut-off valve in opposition to force generated by the control means causing the shut-off valve to move from its closed position to its opened position.

One feature of the present invention is the provision of second passageway means for communicating fuel vapor from the first passageway means to the inner region of the conducting means to the inner region of the conducting means while the first valve means is in its flow-blocking position. Such communication of fuel vapor through the second passageway means advantageously functions to equalize fuel vapor pressure in the first passageway means and the inner region in relatively short order when the first valve means is in its flow-blocking position.

In one preferred embodiment, the second passageway means operates to communicate fuel vapor pressure from the first passageway means to that portion of the inner region intermediate the first valve means and an overfill shut-off valve. In the event that the tank is overfilled as a result of a malfunction in the fuel-dispensing nozzle, the overfill shut-off valve is moved against a spring to a closed position to block flow of fuel vapor from the tank to the canister. Fuel vapor pressure is supplied from the fuel tank to said inner region portion by the second passageway means.

When the cap is reinstalled on the filler neck following refueling, this "supplied" pressure helps to develop sufficient pressure on the "canister side" of the shut-off valve to balance the pressure extant on the "tank side" of the shut-off valve so that the spring is able to move the shut-off valve without significant "fuel vapor pressure resistance" to its normally open position. Advantageously, minimization of the fuel vapor pressure differential on opposite upstream and downstream sides of the shut-off valve because of the fuel vapor pressure communicable through the second passageway means leads to earlier opening of the shut-off valve following closure caused by a fuel-dispensing nozzle malfunction, thereby providing greater opportunity for venting of pressurized fuel vapor in the tank to the canister.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

FIG. 4 is a view similar to FIG. 3 with portions broken away showing the operation of the assembly after cap removal;

FIG. 5 is a view similar to FIG. 4 showing the operation of the assembly during refueling;

FIG. 8 is a view similar to FIG. 7 showing operation of the assembly during a continued overfill condition;

FIG. 9 is a view similar to FIG. 8 showing operation of the assembly during a lower than normal pressure condition within the fuel tank;

DETAILED DESCRIPTION OF THE DRAWINGS

Figure 1:
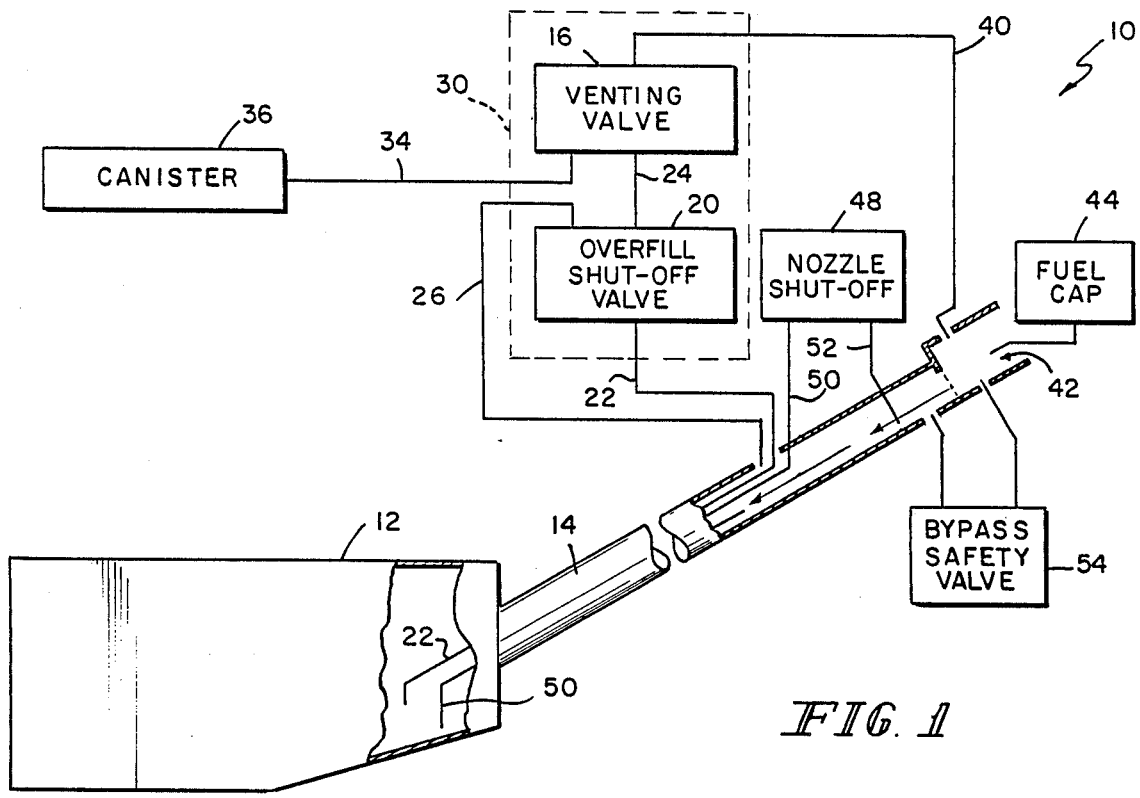
FIG. 1 is a partial block diagram schematically illustrating the tank conduit and vapor control arrangement according to one embodiment of the present invention.

Referring now to the drawings, and specifically to FIG. 1, one preferred embodiment of a fuel vapor recovery system 10 is illustrated in block diagram. The fuel vapor recovery system 10 includes a fuel tank 12 having a conduit 14. The system 10 also includes a venting valve 16, and an overfill shut-off valve 20. One input to the overfill shut-off valve 20 is provided by an overfill valve hose 22 which extends into the fuel tank 12. The venting valve 16 and overfill shut-off valve 20 are placed in fluid communication by a vapor flow passage 24. Fuel vapor (not shown) is permitted to flow from the conduit 14 through a fuel vapor escape hose 26, past the overfill shut-off valve 20, to the venting valve 16. The venting valve 16 and overfill shut-off valve 20, as well as the vapor flow passage 24, cooperate to form a refueling vent control valve assembly 30.

The refueling vent control valve assembly 30 acts to control the flow of fuel vapor from the fuel tank 12 and conduit 14 through a fuel vapor discharge hose 34 to a conventional canister 36. It will be understood that the canister 36 acts as a fuel vapor treatment site for treating and controlling fuel vapor routed thereto. Preferably, the canister 36 is a conventional charcoal canister or other vapor condenser which adsorbs liquid fuel entrained in the recovered fuel vapor onto a substrate to permit recombustion within the vehicle engine (not shown).

The venting valve 16 is at least partially controlled by an actuation conduit 40 which is coupled to a cap receiving cavity 42 which is normally sealed by a conventional fuel cap 44. It will be understood that the fuel cap 44 may be removed from the cap receiving cavity 42 to initiate the filling operation. The actuation conduit 40 acts to communicate various pressure levels to the venting valve 16 depending upon various operating conditions of the system 10, and acts as one input into the control of the position of the venting valve 16. The conduit 14, the cavity 42, and the actuation conduit 40 cooperate to form passageway means for communicating pressure to the venting valve 16 under certain conditions.

The system 10 also includes a nozzle shut-off means 48 which is configured to control the shut off of a fuel dispensing nozzle (not shown) during the filling operation. The nozzle shut-off means 48 receives an input from a nozzle shut-off hose 50 which extends into the fuel tank 12. The nozzle shut-off means 48 has an output which communicates to the upper portion of the conduit 14 to control the shut-off operation of the fuel dispensing nozzle. In addition, system 10 includes a bypass safety valve means 54 which provides selective venting communication between the conduit 14 and the cap receiving cavity 42 under certain operating conditions.

It will be understood that the vapor recovery system 10 illustrated in FIG. 1 is included in the vehicle, and specifically, except for the canister 36, may be mounted on the conduit 14 leading to the fuel tank 12.

Figure 2:
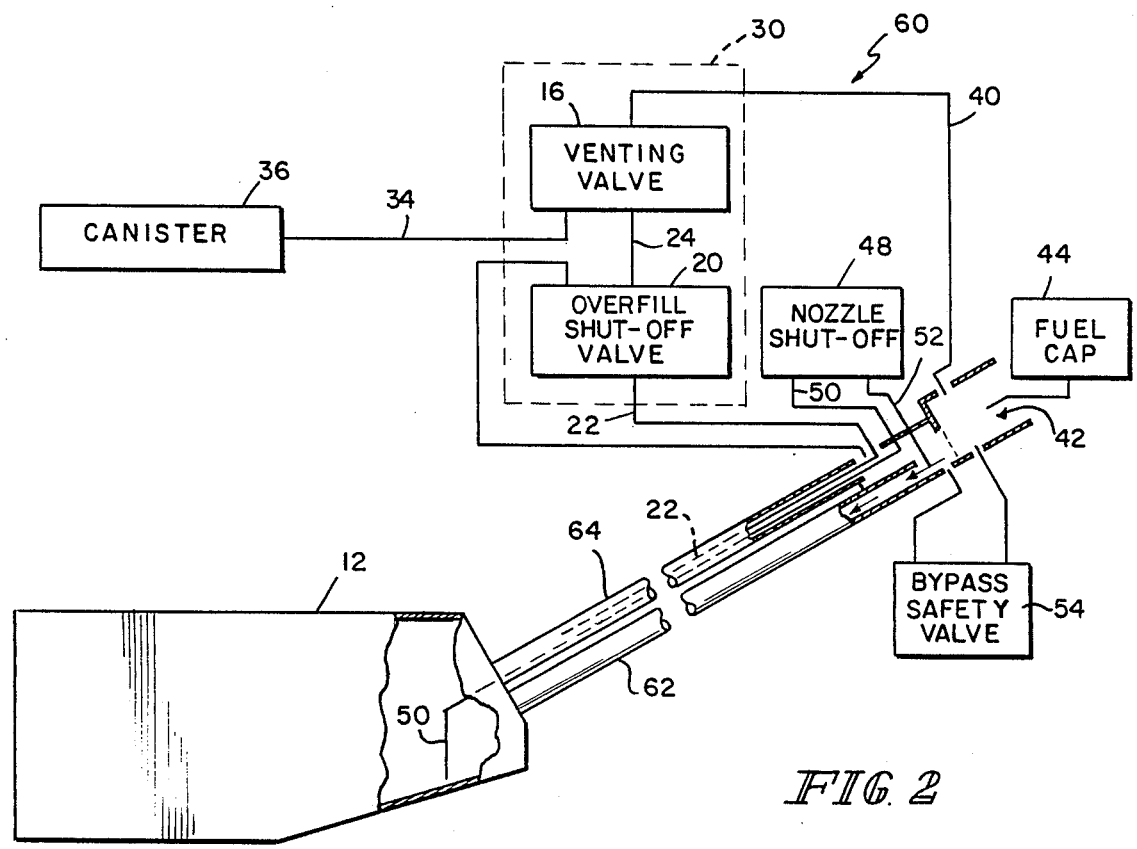
FIG. 2 is a partial block diagram schematically illustrating the tank conduit and vapor control arrangement according to another embodiment of the present invention.

FIG. 2 shows another embodiment of a vapor recovery system 60 in block diagram which operates substantially like the system 10 illustrated in FIG. 1. In the vapor recovery system 60, the conduit illustrated in FIG. 1 is divided into two separate tubes. Specifically, the system 60 includes a fuel fill tube 62 for routing fuel to the fuel tank 12, and a separate control tube 64 for providing the vapor flow path to the venting valve 16 and for providing the necessary inputs to the overfill shut-off valve 20 and the nozzle shut-off 48. A system 60 as illustrated in FIG. 2 may be preferable to the system 10 illustrated in FIG. 1 depending upon the mounting requirements within different vehicles. However, the function of the systems 10 and 60 is substantially the same.

Figure 3:
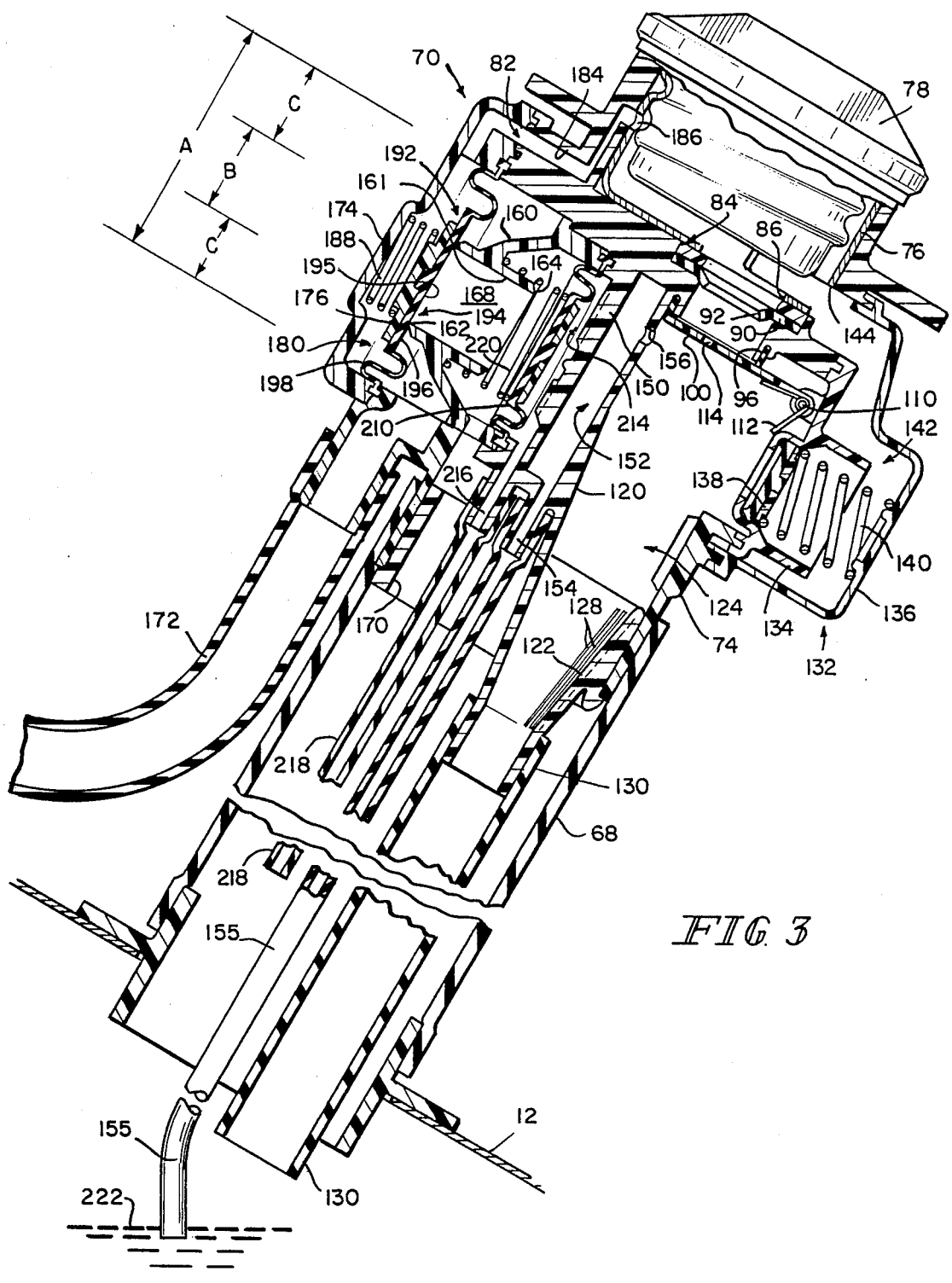
FIG. 3 is a transverse sectional view of the vapor recovery assembly illustrated in FIG. 1 in combination with a fuel tank.

FIG. 3 illustrates the preferred embodiment of the system 10 shown in block diagram in FIG. 1. Specifically, FIG. 3 illustrates a vapor recovery assembly 70 which includes all of the functions of the system 10 illustrated in FIG. 1. The assembly 70 is a generally concentric elongated structure which includes a housing assembly 74 which is mated with a generally cylindrical outside hose member 68 to form the generally cylindrical, elongated assembly 70. As can be seen, the outside hose member 68 is mounted on and extends through a wall of the fuel tank 12.

A cap receiving cup 76 is included in the axially upper portion of the housing assembly 74. The cap receiving cup 76 includes formed threads which are configured to receive the threads on a conventional fuel cap 78. Illustratively, the cap 78 is of the type which enables pressure within the fuel system to vent before the seal between the fuel cap 78 and a seal (not shown) around the cap receiving cup 76 is broken. Such a fuel cap is illustrated in U.S. Pat. No. 4,676,390 to Harris which is assigned to the assignee of the present invention.

A housing insert 82 is disposed within the housing assembly 74 to define various internal structure within the vapor recovery assembly 70. The housing insert 82 is formed to include an axially upper orifice 4 which is in fluid communication with an opening 86 in the cap receiving cup 76. A nozzle seal assembly 90 is disposed around the axially upper portion of the orifice 84. The nozzle seal assembly 90 includes an annular seal 92 which is sized and configured to receive and seal around a conventional fuel dispensing nozzle (not shown in FIG. 3) when such a nozzle is inserted through the nozzle seal assembly 90 and seal 92. An axially downwardly facing ledge 96 is formed on the axially lower portion of the orifice 84 such that the ledge 96 forms a generally circular seat.

A trap door assembly 100 is provided and is biased to contact the seat formed by the ledge 96 under normal operating conditions. The trap door assembly 100 is mounted on a pivot 110 which permits the trap door assembly 100 to move between a closing position as shown in FIG. 3 and an open position as shown in FIG. 5. A spring 112 is provided to normally bias the trap door assembly 100 to the closed position where it contacts the ledge 96 to form a substantially fluid tight seal. An orifice 114 is provided in the trap door assembly 100 to permit a limited degree of venting communication through the trap door assembly 100. The necessity of this limited venting communication will be discussed later. Illustratively, the orifice 114 is a circular orifice having a diameter of approximately 0.030 inches (0.076 cm.).

The housing insert 82 includes a generally longitudinally extending inner wall 120 and a shorter, generally longitudinally extending outer wall 122. The inner wall 120 and the outer wall 122 converge somewhat in the direction away from the orifice 74, and cooperate to form a somewhat tapered conical fuel nozzle chamber 124. The fuel nozzle chamber 124 is thus bounded at its axially upper end by the normally closed trap door assembly 100 and at the sides by the inner wall 120 and the outer wall 122. The axially lower portion of the fuel nozzle chamber 124 is open and is coupled to a fuel hose 130 which extends axially downwardly into the fuel tank 12. Ribs 128 are formed on a portion of the interior surface of the fuel nozzle chamber 124, with the ribs extending generally longitudinally and circumferentially spaced apart from each other. The use of the ribs 128 will be discussed later.

A bypass safety valve assembly 132 is included in the housing insert 82 near the axially upper portion of the fuel nozzle chamber 124. The bypass safety valve assembly 132 includes a bypass insert member 134 which is inserted into the housing insert 82. A bypass cover 136 is disposed on the housing insert 82 and located radially outwardly from the bypass insert member 134. A bypass valve member 138 is disposed for radial movement within the bypass insert member 134 and is configured to move between a valve closed position and a valve open position. A bypass valve spring 140 is provided which acts against the bypass cover 136 to normally urge the bypass valve member 138 to the valve closed position. A bypass channel 142 is provided by the bypass cover 136 and which is configured to permit selective venting communication between the fuel nozzle chamber 124 and a bypass opening 144 formed in the cap receiving cup 76 when the bypass valve member 138 is in the valve open position. The use of the bypass channel 142 to provide selective venting communication between the fuel nozzle chamber 124 and the cap receiving cup 76 will be discussed later.

A chamber defining wall 150 is included in the housing insert 82 in a substantially parallel, spaced apart relation to the inner wall 120. The chamber defining wall 150 cooperates with the inner wall 120 and a portion of the housing insert 82 to form a nozzle shut-off control chamber 152. The nozzle shut-off control chamber 152 includes an inlet 154 which is connected to a nozzle shut-off hose 155 that extends into the fuel tank 12. An orifice 156 is formed in the inner wall 120 to permit controlled venting communication between the control chamber 152 and the fuel nozzle chamber 124.

A venting insert 160 is attached to a portion of the housing assembly 74 and a portion of the housing insert 82. The venting insert 160 includes a generally cylindrical shaped channel portion 161 which has a radially outer end 162 and a radially inner end 164. The channel portion 161 forms a vapor flow passage 168 for conducting fuel vapor (not shown) away from the fuel tank 12. Fuel vapor from the fuel tank 12 is directed toward the vapor flow passage 168 through a vapor conduit 170 and the outside hose member 68. A vapor discharge hose 172 is provided to guide the fuel vapor from the outer end 162 of the vapor flow passage 168 toward the canister (not shown in FIG. 3).

A venting cover 174 is attached to the housing assembly 74 radially outwardly from the venting insert 160 A venting valve 176 is provided between the outer end 162 of the venting insert 160 and the venting cover 174. The venting valve 176 is configured to selectively seal the outer end 162 of the venting insert 160 under selected operating conditions. The venting valve 176 is configured to move between a valve closed position as shown in FIG. 3 and a valve open position (not shown in FIG. 3) to selectively control the flow of fuel vapor through the vapor flow passage 168.

The venting cover 174 and venting valve 176 are configured to cooperate to form a venting control chamber 180 between the venting cover 174 and the venting valve 176. The venting control chamber 180 is coupled for fluid communication to the cap receiving cup 76 through an actuation conduit 184. The actuation conduit 184 terminates in an actuation conduit opening 186 in the cap receiving cup 76. Except for the actuation conduit 184, the venting control chamber 180 is a sealed chamber, the use of which will be discussed later. A venting valve spring 188 is disposed between the venting cover 174 and the venting valve 176 to provide a biasing force to bias the venting valve 176 to the valve closed position in the absence of any other forces acting on the venting valve 176.

The venting valve 176 is a generally circular valve having a radially outer or first side 192 and a radially inner or second side 194. The second side 194 is effectively divided into two portions, an inner portion 195 and an outer or peripheral portion 196. The demarcation between the inner portion 195 and the outer portion 196 is defined by the venting insert 160, and specifically the outer end 162 of the venting insert 160. Specifically, the portion of the second side 194 of the venting valve 176 bounded by the generally circular outer end 162 of the venting insert 160 defines the inner portion 195. The portion outside of the outer end 162 of the venting insert 160 defines the peripheral portion 196. The first side 192 of the venting valve 176 has a diameter indicated by the dimension A. The inner portion 195 of the second side 194 of the venting valve 176 has a diameter indicated by the dimension B. The peripheral portion 196 has a width indicated by the dimensions C. It will be understood that the dimension B plus two times the dimension C equals the dimension A.

A flexible diaphragm 198 is provided to flexibly attach the venting valve 176 to the housing assembly 74 and housing insert 82. The flexible diaphragm 198 is configured to permit radial movement of the venting valve 176 without imposing any force on the venting valve 176 in either the valve closing direction or the valve opening direction.

It will be understood by referring to FIG. 3 that the two portions 195, 196 of the second side 194 of the venting valve 176 may be exposed to differing pressures under certain circumstances. In addition, the first side 192 of the venting valve 176 may be exposed to a pressure from the venting control chamber 180 which may differ from one or both of the pressures exerted on the second side 194 of the venting valve 176. Because of the relative dimensions of the first side 192 and the two portions 195, 196 of a second side 194, the pressures exposed to the first side 192 and the separate portions 195, 196 may create differing forces acting on the venting valve 176 which can cause the valve 176 to move either to the valve closed position or the valve open position depending upon the conditions at that time.

Specifically, the pressure within the venting control chamber 180 acts over the area of the first side 192 of the venting valve 176 illustrated by the dimension A to create a force which acts on the first side 192 of the valve 176. The pressure within the vapor discharge hose 172 acts on the portions 196 of the second side 194 of the valve 176 illustrated by the dimensions C to create a force on the portion 196. Additionally, pressure within the vapor flow passage 168 acts on the inner portion 195 of the second side 194 of the valve 176 to create a force on the portion 195. Depending upon the conditions, these forces acting on the venting valve 176 created by the pressures acting over the respective areas may cause the venting valve 176 to move to the valve open position or the valve close position. Thus, at certain times in the operation of the assembly 70, differing forces may be acting on both sides of the venting valve 176, dictated by differing pressures and pressure exerting areas of different sizes on both sides of the valve 176. These differing forces, combined with the biasing force of the spring 188 act to control the movement of the venting valve 176 to control the flow of vapor through the vapor flow passage 168.

An overfill shut-off valve 210 is mounted within the housing insert 82 to selectively seal the inner end 164 of the venting insert 160 under certain circumstances. Specifically, the overfill shut-off valve 210 is configured to move between a valve open position as shown in FIG. 3 and a valve closed position (shown in FIG. 7) which will close the vapor flow passage 168. The valve 210 cooperates with the chamber defining wall 150 to define an overfill control chamber 214 therebetween. The control chamber 214 includes an opening 216 which communicates through an overfill tube 218 to the interior of the outside hose 68. A spring 220 is provided which acts between the venting insert 160 and the shut-off valve 210 to normally bias the valve 210 to its valve open position. The overfill control chamber 214 is configured such that when fuel enters the overfill tube 218, an increased pressure is created within the control chamber 214 which overcomes the biasing force of the spring 220 and forces the shut-off valve 210 to the valve closed position. This operation of the valve 210 to close the vapor flow passage 168 will be discussed later.

In operation, and continuing to refer to FIG. 3, under normal vehicle operation with the cap 78 installed in the assembly 70, the fuel system, and specifically the fuel tank 12 will be slightly pressurized because of vaporization of fuel 222 within the fuel tank 12. This pressure created within the fuel tank 12 will be present within the assembly 70, and specifically will be present within the vapor conduit 170, the fuel nozzle chamber 124, and the cap receiving cup 76. This pressure within the fuel tank 12 and other portions of the assembly 70 will be referred to as "system pressure". This "system pressure" is communicated to the cap receiving cup 76 from the fuel nozzle chamber 124 through the orifice 114. In addition, this "system pressure" will be communicated from the cap receiving cup 76 to the venting control chamber 180 through the actuation conduit opening 186 and actuation conduit 184.

Thus, under normal operating conditions, the venting valve 176 will have a radially inwardly directed force exerted upon its first side 192 which is created by the "system pressure" within the venting control chamber 180 acting over the area defined by the dimension A. In addition, a radially outwardly directed force will be exerted upon the second side 194 of the venting valve 176 due to the "system pressure" acting on the area defined by the dimension B. Additionally, a radially outwardly directed force will be exerted upon the venting valve 176 due to the pressure within the vapor discharge hose 172 acting upon the area of the peripheral portion 196 indicated by the dimensions C. In the configuration illustrated in FIG. 3, this pressure within the vapor discharge hose 172 will be substantially atmospheric pressure which will be somewhat lower than the "system pressure".

Thus, the radially inwardly directed force, or valve closing force, exerted upon the venting valve 176 will be greater than the radially outwardly directed, or valve opening force, exerted on the venting valve 176. Thus, during normal operation with the cap 78 in place and "system pressure" prevailing within the assembly 70, the venting valve 176 will be held in the valve closed position as illustrated in FIG. 3. In addition to these differing forces created by the differing pressures acting upon differing areas, the biasing force of the spring 188 aids in urging the venting valve 176 to the valve closed position.

With the venting valve 176 in the valve closed position as illustrated in FIG. 3, the vapor flow passage 168 is sealed and no fuel vapor can be vented to the canister (not shown). Should the "system pressure" rise above a predetermined, normal level, such "excessive system pressure" may cause the bypass safety valve assembly 132 to open to vent this excessive pressure to the cap receiving cup 76. This excessive pressure, if it reaches a high enough level, will then be vented through the normal pressure valve (not shown) contained within the fuel cap 78.

FIG. 4 illustrates the operation of the vapor recovery assembly 70 during a preliminary step to refueling of the fuel tank 12. Specifically, FIG. 4 illustrates the assembly 70 after the fuel cap 78 has been removed. As discussed previously, during normal vehicle operation a "system pressure" is created within the assembly 70 and fuel tank 12. After fuel cap removal, because the trap door assembly 100 is substantially sealed against the ledge 96, this "system pressure" is not permitted to vent to the atmosphere. The only opening to the atmosphere from the fuel nozzle chamber 124 is through the small orifice 114. The size of this orifice 114 is insufficient to permit rapid venting of the "system pressure" to the atmosphere immediately following cap removal. However, in this configuration, the assembly 70 is configured to vent this "system pressure" through the canister (not shown). Venting through the canister is accomplished by moving the venting valve 176 to the valve open position to open the vapor flow passage 168. The venting valve 176 is moved to the valve open position as follows.

Immediately upon cap removal, the actuation conduit 184 is exposed to atmospheric pressure through the actuation opening 186. This permits the "system pressure" contained within the venting control chamber 180 to dissipate and to lower to atmospheric pressure. After the pressure within the venting control chamber 180 has reduced to atmospheric pressure, the valve closing force exerted upon the first side 192 of the venting valve 176 is reduced because the pressure has been reduced. However, the inner portion 195 of the second side 194 of the venting valve 176 is still exposed to "system pressure" through the vapor flow passage 168. This "system pressure" acting upon the portion 195 creates a force which is greater than the valve closing force exerted on the first side 192 of the venting valve 176. This difference in forces causes the venting valve 176 to move to the valve open position.

With the venting valve 176 open, the "system pressure" is directed through the vapor conduit 170 and vapor flow passage 168 and outwardly to the canister through the vapor discharge hose 172. Thus, before the operator begins the filling operation, the pressure within the fuel tank 12 and assembly 70 will be substantially dissipated to atmospheric pressure.

FIG. 5 illustrates the normal filling operation of the fuel tank 12 by a refuel nozzle 236. The normal refuel nozzle utilized at service stations includes an automatic shut-off feature which normally acts to shut-off the flow of fuel from the nozzle. This automatic shut-off feature is controlled by a vacuum created within the nozzle, such as nozzle 236. As the nozzle 236 pumps fuel, a vacuum or lower than atmospheric pressure is created within the nozzle 236 which overcomes a spring biased valve (not shown) to permit the flow of fuel. However, should the vacuum rise above a certain preset level within the nozzle 236, a diaphragm (not shown) within the nozzle 236 pulls down and overcomes the spring and closes the valve within the nozzle 236 to shut off the flow of fuel. Thus, it is a high vacuum internal to the nozzle 236 that causes the nozzle 236 to shut off.

To eliminate premature vacuum build up within the nozzle 236 during normal pumping of fuel, a relief port 242 is provided substantially near a discharge end 238 of the nozzle 236. This relief port 242 is connected to a relief tube 244 which extends upwardly into the nozzle 236 to prevent the vacuum within the nozzle 236 from building above the preset vacuum level. As long as air or vapor is available to flow through the relief tube 244, the vacuum within the nozzle 236 will not increase to the shut-off level.

Conventionally, normal automatic shut off of the nozzle 236 is accomplished when the fuel tank is substantially filled by permitting fuel to splash back to cover the relief port 242. With the relief port 242 covered, relief air or "make-up" air is eliminated from the relief tube 244, and the vacuum created by pumping fuel within the nozzle 236 increases above the pre-set level to shut the nozzle 236 off. However, because fuel splashback can be highly inconsistent and inaccurate, the vapor recovery assembly 70 relies instead upon extinguishing the supply of "make-up" air or vapor to the relief tube 244.

As the nozzle 236 is inserted into the fuel nozzle chamber 124, the discharge end 238 first passes through the nozzle seal 92. By engaging the nozzle seal 92, the refuel nozzle 236 and seal 92 cooperate to provide an axially upper fluid seal for the refuel nozzle chamber 124. As the nozzle 236 continues to enter toward the fuel nozzle chamber 124, the discharge end 238 engages the trap door assembly 100 and overcomes the bias provided by the spring 112 to move the trap door assembly 100 to the open position. Because of the axial spacing provided between the seal 92 and the trap door assembly 100, it is insured that the trap door assembly 100 will not be open before the seal between the nozzle 236 and nozzle seal 92 is established. This advantageously prevents the possibility that any fuel or fuel vapor will be discharged toward the operator should "system pressure" still be present within the system. Although normal venting of the "system pressure" was described above in relation to FIG. 4, such venting of "system pressure" could possibly not occur under certain unusual circumstances due possibly to blockage of certain portions of the assembly 70. However, because of the seal between the nozzle 236 and the nozzle seal 92, the potential for discharge of the "system pressure" out of the fuel nozzle chamber 124 after the trap door assembly 100 has been opened is eliminated.

When the nozzle 236 is activated to begin pumping of fuel as indicated by the arrows 240, an effective seal is created at the axially lower end of the fuel nozzle chamber 124 by the fuel flowing into the fuel hose 130. This seal is established because of the close matching of the diameter of the discharge end 238 of the nozzle 236 and the diameter of the fuel hose 130. Thus, a substantially sealed fuel nozzle chamber 124 is established under these fuel pumping conditions. Because the fuel nozzle chamber 124 is substantially sealed, a vacuum is created within this chamber 124 due to the pumping of the fuel. To prevent the vacuum within the chamber 124 from rising above the preset level which would otherwise activate the automatic shut-off features of the nozzle 236, "make-up" air is provided to the chamber 124 through the orifice 156 from the shut-off control chamber 152. This "make-up" air is provided to the control chamber 152 through the hose 155 which extends into the fuel tank 12. By providing this "make-up" air from the control chamber 152, the vacuum within the fuel nozzle chamber 124 is controlled, and is maintained below the preset level necessary to shut off the nozzle 236. It will be understood that the size of the control chamber 152 and the size of the orifice 156 are selected to permit the correct amount of "make-up" air or vapor to constantly flow into the fuel nozzle chamber 124.

When the lower end (not shown) of the hose 155 becomes covered with fuel, the supply of "make-up" air to the control chamber 152 will be immediately shut off. Thus, under these conditions, the supply of "make-up" air to the fuel nozzle chamber 124 will immediately cease. When this "make-up" air is eliminated from the fuel nozzle chamber 124, the vacuum within the fuel nozzle chamber 124 quickly rises above the pre-set level necessary to disable the nozzle 236. Thus, the inflow of fuel from the nozzle 236 is immediately shut off. Because the flow of "make-up" air is shut off immediately when the fuel reaches the end of the hose 155 which immediately results in automatic shut-off of the refuel nozzle 236, the filling level within the tank 12 is accurately controlled by proper placement of the end of the hose 155.

When fuel is entering the fuel tank 12 as indicated by the arrows 240, fuel vapor is created within the fuel tank which creates a pressure within the fuel tank 12 somewhat above atmospheric pressure. This excess fuel vapor pressure will be guided through the vapor flow passage 168 and outwardly to the canister through the vapor discharge hose 172 as indicated by the arrows 246. The venting valve 176 is maintained in the valve open position because of the differential forces exerted on the valve 176. Specifically, atmospheric pressure is still present within the venting control chamber 180 which creates a specified valve closing force on the valve 176. However, the increased fuel vapor pressure within the fuel tank 12 is exerted on the portion 195 of the valve 176 through the vapor flow passage 168. This increased pressure acting over the area defined by the vapor flow passage 168 creates a valve opening force which overcomes the valve closing force and the biasing force provided by the spring 188 to cause the valve 176 to remain in the valve open position. This increased pressure within the fuel tank 12, and consequently within the conduit 170, will remain so long as fuel is being pumped into the fuel tank 12. Thus, so long as fuel is being introduced into the fuel tank 12, the increased pressure will be exerted on the portion 195 of the valve 176 through the vapor flow passage 168 which will cause the valve 176 to remain in the valve open position.

In order to prevent a possibility that liquid fuel might migrate axially upwardly between the outer surface of the nozzle 236 and the inner surface of the fuel nozzle chamber 124 due to capillary action, the ribs 128 create adequate spacing between the nozzle 236 and the surface of the fuel nozzle chamber 124 to prevent any such upward migration of fuel due to capillary action. It will be understood that such migration of fuel due to capillary action might otherwise cause premature shut off of the nozzle 236 due to such migrating fuel possibly covering the relief port 242.

Figure 6:
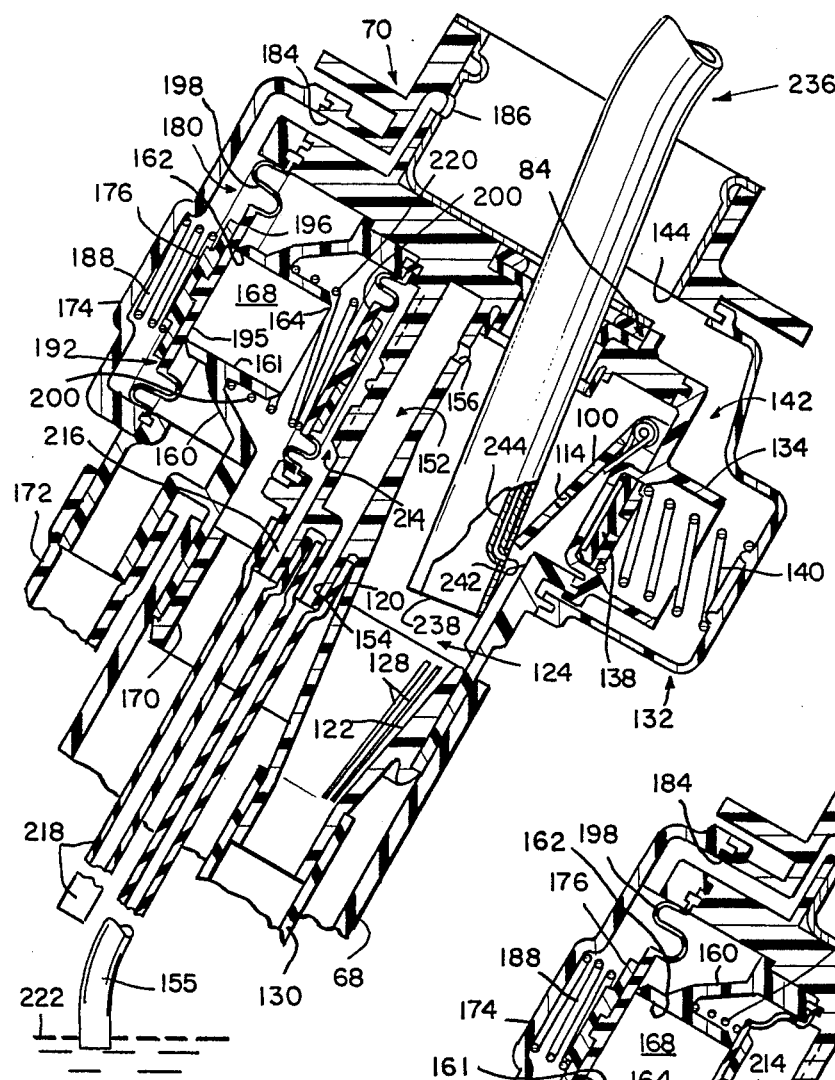
FIG. 6 is a view similar to FIG. 5 showing operation of the assembly to control the automatic shut-off of the fuel nozzle.

FIG. 6 illustrates the vapor recovery assembly 70 immediately after the fuel nozzle 236 has been shut off due to the fuel 220 covering the distal end of the hose 155 to shut off the supply of "make-up" air to the control chamber 152. As soon as fuel ceases to flow into the fuel tank 12 (not shown), the pressure within the fuel tank 12 and entire system decreases almost immediately to atmospheric pressure. This decrease in pressure is attributable to the fact that the increased pressure due to creation of fuel vapor is only created while fuel is flowing into the fuel tank 12. As soon as fuel ceases to flow into the fuel tank 12, the creation of fuel vapor is eliminated, and therefore the source of the increased pressure within the system is also eliminated.

When the pressure within the conduit 170 and vapor flow passage 168 decreases to atmospheric pressure, the valve 176 will close to seal the vapor flow passage 168. This closure of the valve 176 is caused by the biasing force of the spring 188. Specifically, the pressure within the venting control chamber 180 remains at atmospheric pressure as described previously. Also, the pressure exerted on the portion 196 of the valve 176 is atmospheric pressure due to the canister and vapor discharge hose 172 being at atmospheric pressure. Additionally, the pressure within the vapor flow passage 168 is also atmospheric pressure. Therefore, the opposing forces exerted on the valve 176 due to these opposing pressures are equal.

Thus in this instance, the valve 176 is neither urged to the valve open position or the valve closing position by differing pressures. However, the biasing force of the spring 188 is sufficient to urge the valve 176 to the closed position under these circumstances. Thus, as soon as the refueling operation is completed, the valve 176 will return to the valve closed position to isolate the canister (not shown) from any flow of fuel vapor.

Figure 7:
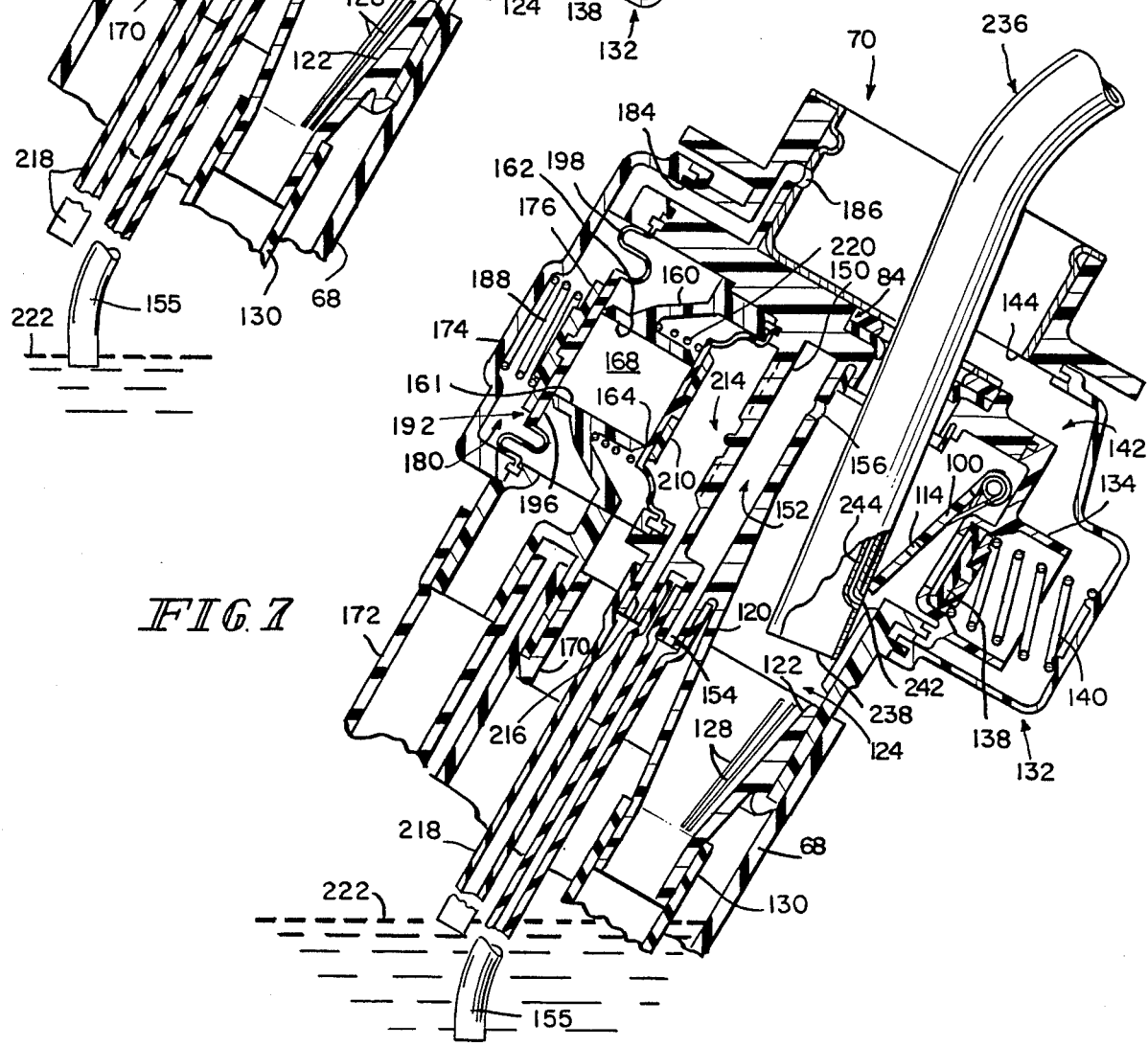
FIG. 7 is a view similar to FIG. 6 showing operation of the assembly during a partial overfill condition.

FIG. 7 illustrates the operation of the vapor recovery assembly 70 should the fuel nozzle 236 continue to pump fuel because of a failure of the automatic shut-off feature of the nozzle 236. Thus, FIG. 7 illustrates that the fuel level 220 has risen above the end of the hose 155, and has covered the end of the overfill tube 218. In such an overfill condition, it will be understood that it is extremely important to protect the canister from any exposure to liquid fuel. To eliminate any possibility of liquid fuel flowing through the vapor flow passage 168 to the canister, the overfill shut-off valve 210 is provided to close the vapor flow passage 168 under such an overfill condition. Specifically, when the fuel level 220 reaches the overfill tube 218, the fuel flows up the overfill tube 218 a certain amount and creates an increase pressure within the overfill control chamber 214. This increased pressure within the overfill control chamber 214 overcomes the biasing force provided by the spring 220 and forces the overfill shut-off valve 210 to the closed position where the vapor flow passage 168 is sealed.

By sealing the vapor flow passage 168, the possibility of any exposure of the canister to liquid fuel is eliminated. So long as fuel 220 remains over the distal end of the overfill tube 218, the increased pressure created within the overfill control chamber 214 will hold the overfill shut-off valve 210 in the closed position. It will be understood that the overfill shut-off valve 210 is necessary because if fuel is continuing to be introduced into the fuel tank 12, fuel vapor will constantly be created which will cause the valve 176 to remain in its valve open position (not shown in FIG. 7). Thus, the additional overfill shut-off valve 210 is necessary to shut off the vapor flow passage 168 under such an overfill condition.

FIG. 8 illustrates the operation of the vapor recovery assembly 70 if the overfill condition illustrated in FIG. 7 is continued. Should fuel be pumped into the fuel tank 12 after the overfill shut-off valve 210 is closed, fuel will ultimately enter the fuel nozzle chamber 124 and continue upwardly. This introduction of fuel into the fuel nozzle chamber 124 will increase the pressure within the fuel nozzle chamber 124. To eliminate this increase of pressure, the bypass safety valve assembly 132 is configured to open to relieve this excess pressure under these conditions. Specifically, the bypass valve member 138 is configured to open by overcoming the bypass spring 140 whenever the pressure within the fuel nozzle chamber 124 reaches a predetermined level. When this predetermined level is reached, the valve 138 opens and fuel and/or fuel vapor is channeled through the bypass channel 142 into the cap receiving cup 76 through the bypass opening 144. The bypass opening 144 is sized and oriented to direct this inflow of fuel in a direction perpendicular to the longitudinal axis of the assembly 70. Additionally, the opening 144 is sized and configured to cause such a flow of fuel to be a low velocity flow into the cup 76. Thus, as fuel is introduced into the cap receiving cup 76 as indicated by the arrows 252, such low velocity flow of fuel will be directed toward the opposite side of the cup 76 and not toward the operator. Such an introduction of fuel into the cup 76 provides a visual indication to the operator that the nozzle should be manually shut off at this point. By providing the capability that this excess fuel and fuel pressure can be vented to the cup 76, excessive pressure build up within the fuel tank 12 is eliminated under these overfill conditions.

FIG. 9 illustrates the operation of the vapor recovery assembly 70 whenever a lower than atmospheric pressure exists within the fuel tank 12. It will be understood that such a lower than atmospheric pressure can occur within the fuel tank 12 whenever the vehicle is exposed to cooler than normal temperatures, such as parking the vehicle overnight. Under such conditions, the fuel and vapor within the fuel tank 12 decreases somewhat in volume which creates a lower than atmospheric pressure within the fuel tank 12. It will be understood that it is necessary to compensate for this lower than atmospheric pressure in order to avoid possible damage to the fuel tank 12 and other systems.

When such a lower than atmospheric pressure exists within the fuel tank 12, this lower than atmospheric pressure will be transmitted to the venting control chamber 180 through the actuation conduit 184. This lower than atmospheric pressure is exerted over the entire area of the first side 192 of the venting valve 176. Although this lower than atmospheric pressure is also exposed to the portion 195 of the second side 194 of the venting valve 176, the force created on the smaller area defined by the portion 195 is insufficient to overcome the valve opening force exerted on the first side 192 of the venting valve 176, and therefore the venting valve 176 is moved to the valve open position. With the venting valve 176 open, atmospheric pressure within the canister and vapor discharge hose 172 is permitted to enter the fuel tank through the vapor flow passage 168 and conduit 170 to relieve the lower than atmospheric pressure within the fuel tank 12. Thus, the vapor recovery assembly 70 operates under such lower than atmospheric system pressures to equalize the lower than normal pressure within the fuel tank to prevent any possible damage to the fuel tank and associated systems. This provides the advantage of purging the canister at intervals.

Figure 10:
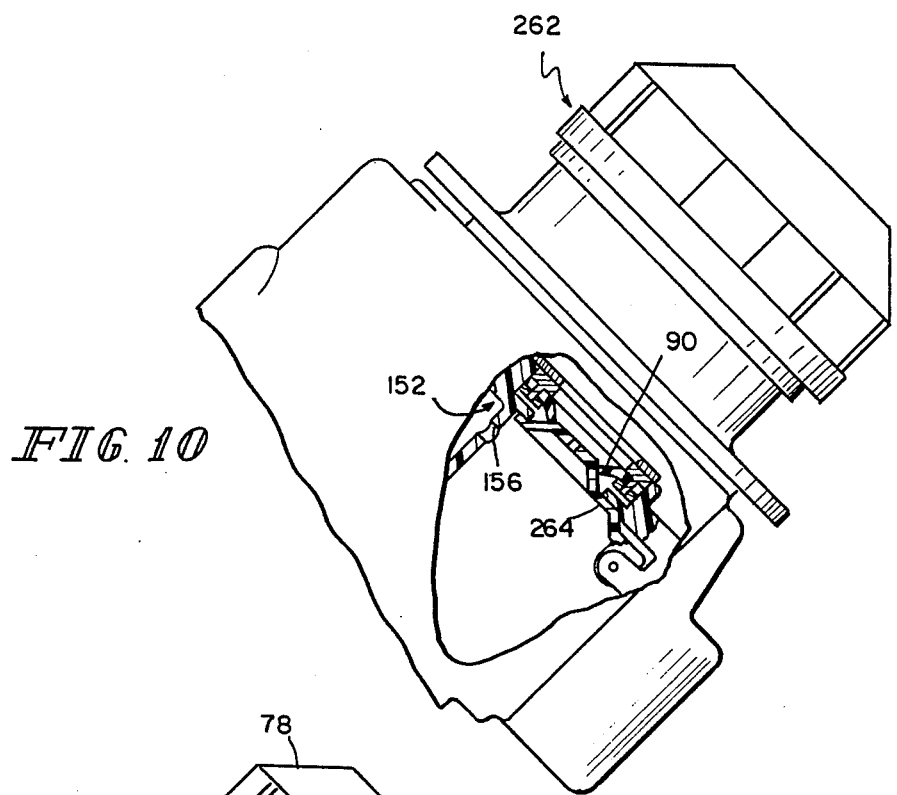
FIG. 10 is an elevational view of a portion of a modified vapor recovery assembly with a portion broken away to expose a modified trap door assembly.

FIG. 10 illustrates another embodiment 262 of a vapor recovery assembly which includes a modified trap door assembly 264. Specifically, the modified trap door assembly 264 is shaped and oriented to come into contact with the nozzle seal 90. By contacting the nozzle seal 90, the trap door assembly 264 is able to provide a more effective seal than the trap door assembly 100 seating against the ledge 96 (shown in FIG. 3).

Figure 11:
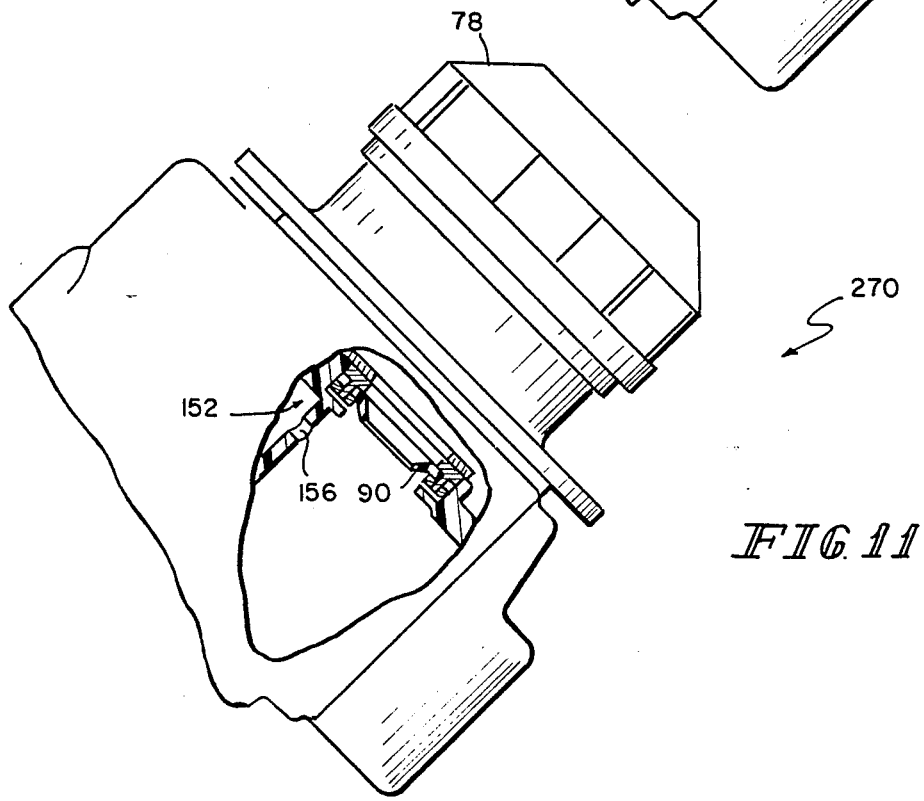
FIG. 11 is a view similar to FIG. 10 illustrating another embodiment which does not include the trap door assembly.

FIG. 11 illustrates another embodiment 270 of a vapor recovery assembly in which the trap door assembly has been eliminated. It will be understood that without a trap door assembly in place, the "system pressure" contained within the fuel tank 12 and assembly 270 will vent to the atmosphere when the fuel cap 78 is removed from the assembly 270. Thus, without a trap door assembly, venting of such "system pressure" through the canister as discussed in the description related to FIG. 4 will not occur. In such an embodiment, it is preferable to include a fuel cap 78 which controls and directs this venting of "system pressure" during cap removal. Such a fuel cap is described in U.S. Pat. No. 4,676,390, the specification of which is hereby incorporated by reference.

Figure 12:
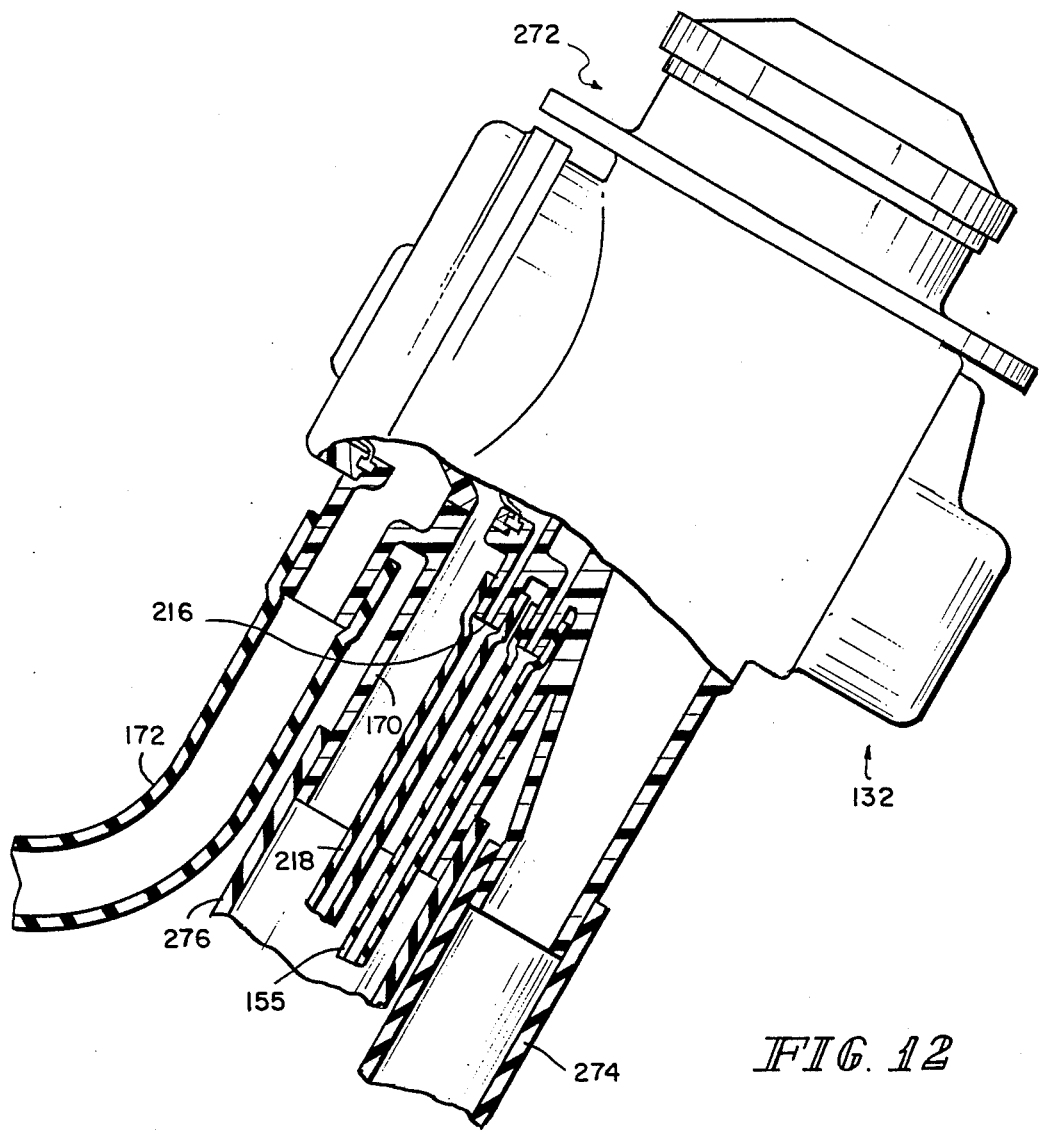
FIG. 12 is a view of another embodiment of the present invention illustrated in FIG. 2 with portions broken away.

FIG. 12 illustrates another embodiment 272 of a vapor recover assembly which corresponds to the modified vapor recovery system 60 illustrated in block diagram in FIG. 2. Specifically, the assembly 270 includes a separate refuel tube 274 which is spaced apart from a vent control tube 276. The vent control tube 276 is configured to contain both the overfill tube 218 and the hose 155, as well as the conduit 170. Such an assembly 272 with a separate refuel tube 274 and vent control tube 276 may be preferable in certain installations as directed by structural requirements. The assembly 272 will function in an identical manner to the assembly 70 illustrated in FIG. 3 except for the attachment of the refuel tube 274 and vent control tube 276 to the fuel tank 12.

Thus, the vapor recovery system of the present invention is configured to control fuel vapor created during fuel introduction into the fuel tank under all normal conditions. The system is also configured to provide for more accurate filling of a fuel tank by controlling more precisely the automatic shut-off characteristics of a fuel nozzle. In addition, the system according to the present invention provides for overfill protection both by protecting the canister from exposure to liquid fuel and by providing a by-pass assembly which prevents any overpressurization of the fuel tank due to overfilling. Additionally, the system provides for equalization of pressure within the fuel tank 12 whenever a lower than atmospheric pressure occurs within the fuel tank.

Figure 13:
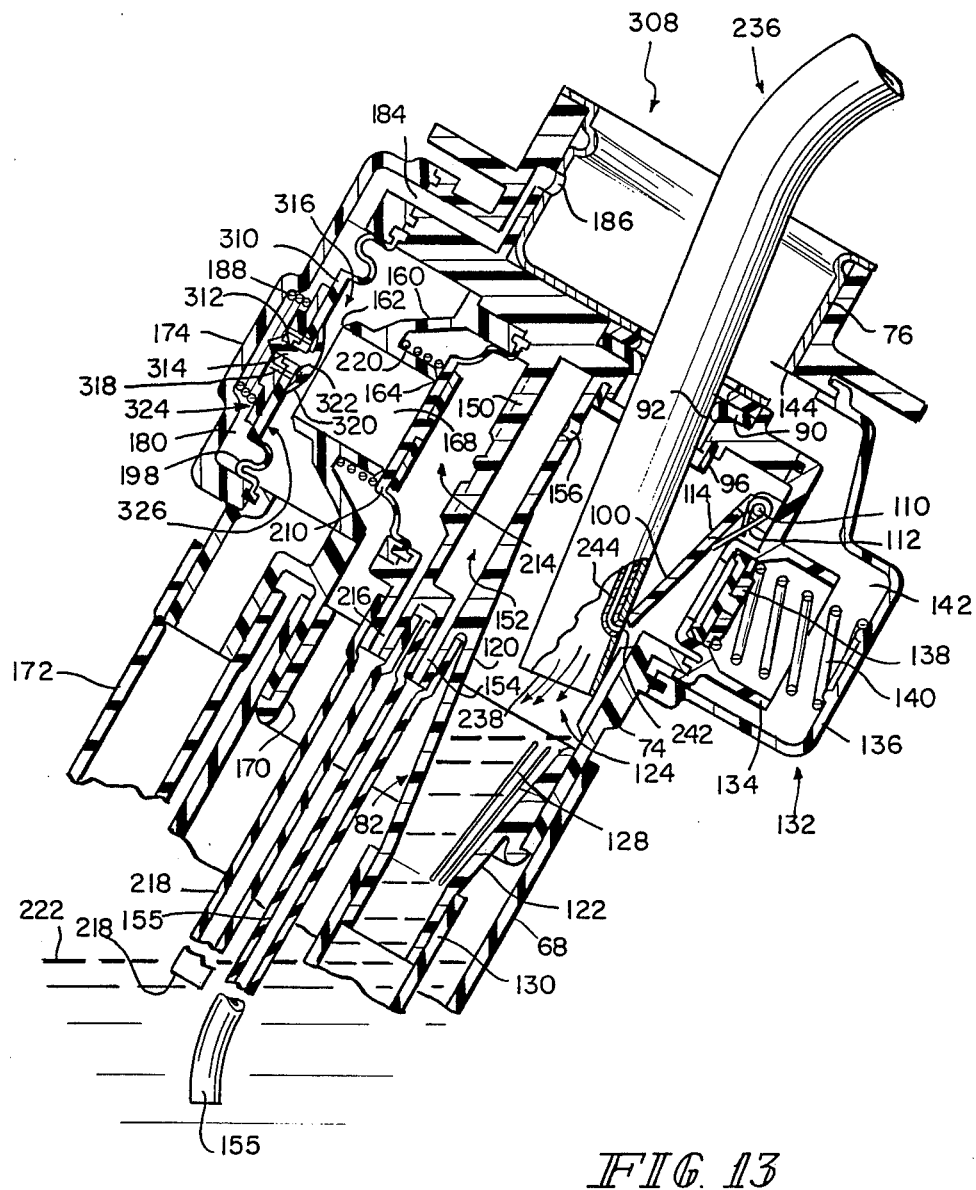
FIG. 13 is a transverse sectional view of yet another embodiment of the present invention showing closure of overfill shut-off valve during refueling after malfunction of a fuel-dispensing nozzle shut-off system.
Figure 14:
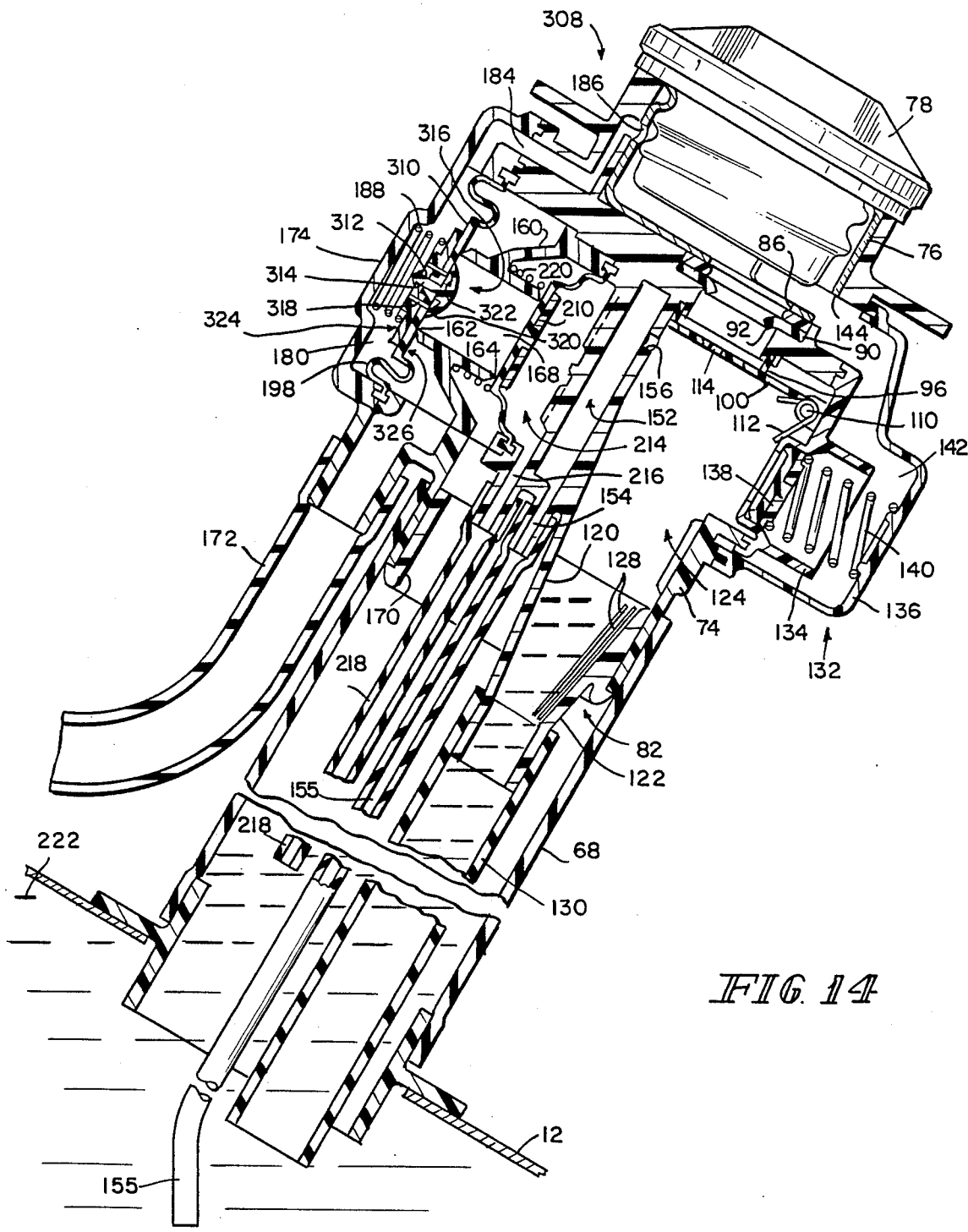
FIG. 14 is a sectional view of the embodiment in FIG. 13 after reinstallation of the fuel cap and closure of the venting valve following refueling.
Figure 15:
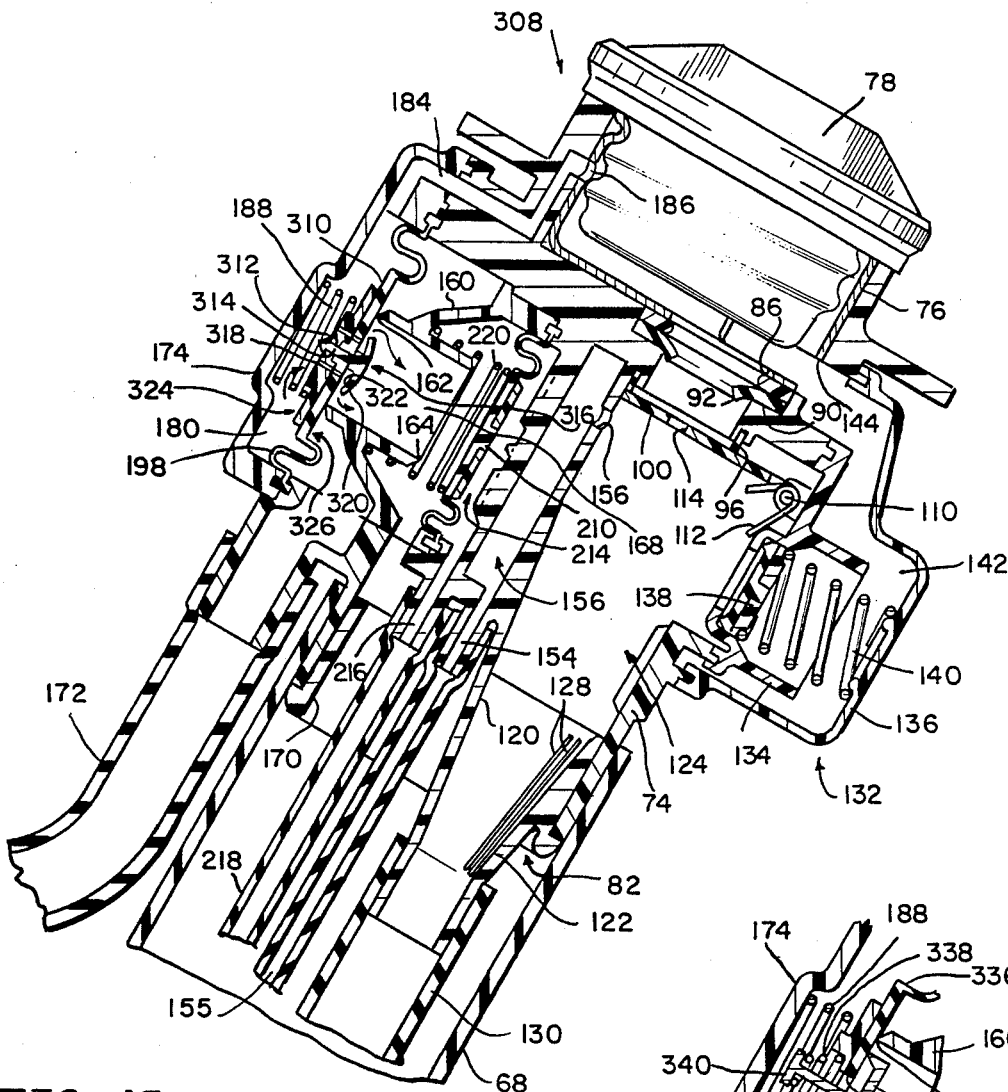
FIG. 15 is a sectional view of the embodiment in FIGS. 13 and 14 showing opening of an auxiliary valve provided in the venting valve to admit fuel vapor into the vent passageway while the venting valve is closed.

In another embodiment of the invention illustrated in FIGS. 13–15, those elements referenced by numbers identical to those in FIGS. 3–12 perform the same or similar function. In the embodiment of FIGS. 13–15, a vapor recovery assembly 308 includes a venting valve 310 that is used in place of the venting valve 176 used in connection with the embodiment of FIGS. 3–12.

Venting valve 310 is formed to include a central aperture 312 arranged to receive mounting stem 314 of auxiliary valve 316 and a plurality of auxiliary venting apertures 318 arranged in orbit about central aperture 312. Auxiliary valve 316 further includes an umbrella-shaped valve head 320 for selectively blocking flow of fuel vapor through venting apertures 318.

Valve 316 is made of pliant material so that it may flex from the closed position shown in FIGS. 13 and 14 to the open position shown in FIG. 15 in response to force applied to an inner wall 322 of valve head 320 by fuel vapor discharged through apertures 318 toward inner wall 322 at a pressure in excess of a predetermined pressure. Thus, valve head 320 serves to regulate the admission of pressurized fuel vapor (system pressure) from venting control chamber 180 into vapor flow passage 168 while venting valve 310 is in its flow-blocking position against the outer end 162 of venting insert 160.

As shown in FIG. 13, overfill shut-off valve 210 closes because of the increased fuel vapor pressure in overfill control chamber 214 following admission of fuel into the mouth of overfill tube 219. Actuation of valve 210 is an abnormal situation that only happens upon failure of the nozzle shut-off system because of, for example, the failure of nozzle seal 92 or of the vacuum-actuated flow shut-off switch in the pump nozzle 236 itself. Such a nozzle shut-off failure causes fuel level 222 in the tank to rise to the mouth of overfill tube 218 as shown in FIG. 13. Even though overfill shut-off valve 210 is closed, bypass valve 138 can still open in the presence of sufficient tank pressure to vent pressurized fuel vapor from the tank to the atmosphere through the open filler neck mouth.

Venting valve 310 remains in its open position at the exact instant that overfill shut-off valve 210 closes as shown in FIG. 13. Pressurized fuel vapor in vapor flow passage 168 continues to hold venting valve 310 in its open position until the pressurized fuel vapor present in vapor flow passage 168 is vented to the atmosphere through the fuel vapor discharge hose 172 and the canister. As a result of this dissipation, atmospheric air is admitted into vapor flow passage 168 through vapor discharge hose 172. At this stage, the fuel vapor pressure in control chamber 214 greatly exceeds the atmospheric pressure present in passage 168.

After a second or two, as a result of such pressure dissipation in passage 168, the pressure on opposite faces 324, 326 of venting valve 310 equalizes at an atmospheric pressure, thereby allowing spring 188 to move venting valve 310 to its sealed position against valve seat 162. Such a result is shown in FIG. 14. At this stage, valves 310 and 210 seal off the opposite ends 162, 164 of vapor flow passage 168 to establish a sealed chamber therein containing the atmospheric air conducted through the vapor discharge hose 172.

The pump operator manually shuts off nozzle flow in a shut-off system failure mode upon seeing the swirling fuel in cup 76. Thereafter, the operator installs the cap 78 on the filler neck. Thus, at the conclusion of the tank-filling activity after a nozzle shut-off failure, the overfill shut-off valve 210 remains in its closed position.

Relaxing of pressure in the fuel tank will ultimately reduce pressure in the overfill control chamber 214 to a level at which spring 220 will act to move overfill shut-off valve 210 to its open position. However, this movement could take some time. In the open position of valve 210, the on-board fuel vapor recovery system is ready to accept another tank-filling sequence and all fuel vapor in the tank will vent through vapor flow passage 168 and vapor discharge hose 172 to the canister.

It is possible that vapor discharged to the canister will be blocked by the overfill shut-off valve 210 if refueling occurs before the valve 210 moves to its open position because of reduction in pressure in overfill control chamber 214. The auxiliary valve 316 in venting valve 310 provides means for admitting "system" pressure provided from the fuel tank through actuation conduit 184 into the vapor flow passage 168 to raise the pressure in passage 168 sufficiently above atmospheric to allow spring 220 to urge valve 210 to its open position away from seat 164. Thus, the on-board vapor recovery system will be available to handle vapor recovery. Otherwise, pressurized fuel vapor would vent through valving or the like provided in or around the cap 78 directly to the atmosphere without opportunity to be recaptured and treated in the canister. By providing the auxiliary valve 316 to introduce fuel vapor pressure into passage 168 in a regulated manner, a system pressure balance is established on either side of valve 210 so that spring 220 is free to move valve 210 from a closed position as shown in FIG. 14 to its open position shown in FIG. 15.

Figure 16:
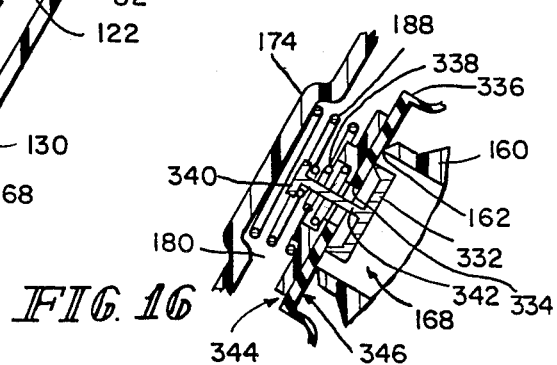
FIG. 16 is a sectional view of another embodiment of the auxiliary valve illustrated in FIG. 15.
Figure 17:
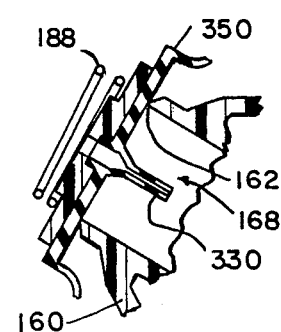
FIG. 17 is a sectional view of yet another embodiment of the auxiliary valve illustrated in FIG. 15.

Alternative embodiments of auxiliary valve means are shown in FIGS. 16 and 17. An alternative auxiliary valve 328 is shown in FIG. 16, while an alternative nozzle 330 is shown in FIG. 17. Valve 328 includes a head 332 for closing a large central aperture 334 formed in venting valve 336. This venting valve 336 is similar in configuration and function to venting valves 176 and 310 in earlier embodiments. A spring 338 acts between a foot 340 on valve stem 342 and the outside face 344 of venting valve 336 to bias valve head 332 to a closed position against inside face 346 of venting valve 336.

In operation, development of pressure in venting control chamber 180 in excess of the nearly atmospheric pressure in vapor flow passage 165 will cause a force to be applied to move valve head 332 in opposition to spring 338 to its open position (not shown). Thus, system pressure is admitted into vapor flow passage 168 even though venting valve 336 is closed.

Nozzle 330 is attached to a venting valve 350 which is similar in configuration and function to valves 176, 310, and 336. The nozzle 330 will provide a constant bleed of system pressure into the passage 168 while the venting valve 310 is closed against valve seat 162. However, the small inner diameter of the nozzle orifice 348 will prevent a large mass of pressurized fuel vapor from escaping from the passage 168 into the vapor discharge hose 172 during normal driving conditions while the venting valve 176 is biased by spring 188 to its normally closed position against valve seat 162. In operation, nozzle 330 provides means for discharging a substantially constant volumetric flow rate of fuel vapor from venting control chamber 180 to vapor flow passage 168 as long as the pressure of the fuel vapor remains substantially constant.

Although the invention has been described in detail with reference to preferred embodiments and specific examples, variations and modifications exist within the scope and spirit of the invention as described and defined in the following claims.

What is claimed is:

1. An apparatus for recovering fuel vapors discharged from a vehicle fuel system during refueling, the vehicle fuel system including a fuel tank having a filler neck and canister means for processing fuel vapor, the apparatus comprising means for conducting fuel vapor between the fuel tank and the canister means, first valve means for selectively blocking flow of fuel vapor through the conducting means, the first valve means being movable in the conducting means between a flow-blocking position and flow-delivery positions, the first valve means dividing the conducting means upon movement of the first valve means to its flow-blocking position into an inner region communicating with the fuel tank and an outer region communicating with the canister means, first passageway means for communicating a closing pressure from the fuel tank to the first valve means to move the first valve means to its flow-blocking position, means for selectively venting the first passageway means to the atmosphere to dissipate any closing pressure therein to permit pressure generated by fuel vapor in the fuel tank having a magnitude in excess of a predetermined threshold level and communicated to the first valve means via the inner region of the conducting means to apply a load to the first valve means sufficient to move the first valve means from its flow-blocking position to a flow-delivery position, thereby permitting pressurized fuel vapor to flow from the fuel tank to the canister means through the conducting means, and second passageway means for communicating fuel vapor from the first passageway means to the inner region of the conducting means while the first valve means is in its flow-blocking position, the second passageway means being situated outside of the fuel tank filler neck.

2. The apparatus of claim 1, wherein the first valve means is formed to include the second passageway means.

3. The apparatus of claim 1, wherein the second passageway means is configured to define means for discharging a substantially constant volumetric flow rate of fuel vapor from the first passageway means to the interior region of the conducting means as long as the pressure of said fuel vapor remains substantially constant.

4. The apparatus of claim 1, further comprising second valve means for selectively blocking flow of fuel vapor through the second passageway means.

5. The apparatus of claim 4, wherein the second valve means is coupled to the first valve means.

6. The apparatus of claim 1, further comprising overfill sensor means in the inner region for blocking flow of liquid fuel and fuel vapor from the fuel tank to the canister means through the conducting means upon accumulation of a predetermined volume of liquid fuel in the fuel tank in excess of a predetermined threshold level, and wherein the first valve means is formed to include the second passageway means.

7. The apparatus of claim 6, further comprising second valve means for selectively blocking flow of fuel vapor through the second passageway means.

8. An apparatus for recovering fuel vapors discharged from a vehicle fuel system during refueling, the vehicle fuel system including a fuel tank and canister means for processing fuel vapor, the apparatus comprising
    means for conducting fuel vapor between the fuel tank and the canister means,
    valve means for selectively blocking flow of fuel vapor through the conducting means, the valve means being movable in the conducting means between a flow-blocking position and flow-delivery positions, the valve means dividing the conducting means upon movement of the valve means to its flow-blocking position into an inner region communicating with the fuel tank and an outer region communicating with the canister means,
    first passageway means for communicating a closing pressure from the fuel tank to the valve means to move the valve means to its flow-blocking position,
    means for selectively venting the first passageway means to the atmosphere to dissipate any closing pressure therein to permit pressure generated by fuel vapor in the fuel tank having a magnitude in excess of a predetermined threshold level and communicated to the valve means via the inner region of the conducting means to apply a load to the valve means sufficient to move the valve means from its flow-blocking position to a flow-delivery position, thereby permitting pressurized flow vapor to flow from the fuel tank to the canister means through the conducting means, and
    second passageway means for communicating fuel vapor from the first passageway means to the inner region of the conducting means while the valve means is in its flow-blocking position, the valve means being formed to include the second passageway means.

9. The apparatus of claim 8, wherein the conducting means includes an inner surface defining a venting aperture and providing a valve seat surrounding the venting aperture, the valve means includes a venting valve positioned at a junction of the conducting means and the first passageway means to provide a common boundary between the conducting means and the first passageway means to that the venting valve receives pressure communicated via the first passageway means and pressure communicated via the conducting means without interconnecting the conducting means and the first passageway means in fluid communication at the junction and spring means for yieldably biasing the venting valve against the valve seat to close the venting aperture, and the second passageway means extends through the venting valve to interconnect the first passageway means and the conducting means.

10. The apparatus of claim 8, wherein the second passageway means is configured to define means for discharging a substantially constant volumetric flow rate of fuel vapor from the first passageway means to the interior region of the conducting means as long as the pressure of said fuel vapor remains substantially constant.

11. The apparatus of claim 9, further comprising means for regulating flow of fuel vapor through the second passageway means.

12. The apparatus of claim 11, wherein the regulating means is coupled to the valve means.

13. The apparatus of claim 11, wherein the venting valve includes a first surface exposed to the conducting means and an oppositely facing second surface exposed to the first passageway means, the valve seat engages the first surface upon closure of the valve means to its flow-blocking position to define a first effective area within the venting aperture exposed to pressure communicated from the fuel tank via the inner region of the conducting means, the second surface has a second effective area exposed to pressure communicated via the first passageway means, the second effective area is greater than the first effective area, and the regulating means includes a valve member yieldably biased against the first surface normally to block flow of fuel vapor through the second passageway means until the difference in pressure in the second passageway means and the conducting means is in excess of a predetermined amount.

14. The apparatus of claim 8, further comprising overfill sensor means in the inner region for blocking flow of liquid fuel and fuel vapor from the fuel tank to the canister means through the conducting means upon accumulation of a predetermined volume of liquid fuel in the fuel tank in excess of a predetermined threshold level, the overfill sensor means including a shut-off valve mounted in the inner region for movement between an opened and closed position and control means for moving the shut-off valve to its closed position upon accumulation of said predetermined volume of liquid fuel in the fuel tank, the second passageway means being configured to communicate pressurized fuel vapor from the first passageway means to the overfill sensor means so that such pressurized fuel vapor is permitted to apply a force to the shut-off valve in opposition to force generated by the control means causing the shut-off valve to move from its closed position to its opened position.

15. The apparatus of claim 14, further comprising means for regulating flow of fuel vapor through the second passageway means.

16. The apparatus of claim 15, wherein the regulating means is coupled to the valve means.

17. An apparatus for recovering fuel vapors discharged from a vehicle fuel system during refueling, the vehicle fuel system including a fuel tank and canister means for processing fuel vapor, the apparatus comprising
    means for conducting fuel vapor between the fuel tank and the canister means,
    valve means for selectively blocking flow of fuel vapor through the conducting means, the valve means being movable in the conducting means between a flow-blocking position and flow-delivery positions, the valve means dividing the conducting means upon movement of the valve means to its flow-blocking position into an inner region communicating with the fuel tank and an outer region communicating with the canister means, first passageway means for communicating a closing pressure from the fuel tank to the valve means to move the valve means to its flow-blocking position, means for selectively venting the first passageway means to the atmosphere to dissipate any closing pressure therein to permit pressure generated by fuel vapor in the fuel tank having a magnitude in excess of a predetermined threshold level and communicated to the valve means via the inner region of the conducting means to apply a load to the valve means sufficient to move the valve means from its flow-blocking position to a flow-delivery position, thereby permitting pressurized fuel vapor to flow from the fuel tank to the canister means through the conducting means, overfill sensor means in the inner region for blocking flow of liquid fuel and fuel vapor from the fuel tank to the canister means through the conducting means upon accumulation of a predetermined volume of liquid fuel in the fuel tank in excess of a predetermined threshold level, and second passageway means for communicating fuel vapor from the first passageway means through the inner region to the overfill sensor means while the overfill sensor means is in a flow-blocking position.

18. The apparatus of claim 17, wherein the conducting means includes an inner surface defining a venting aperture and providing a valve seat surrounding the venting aperture and the overfill sensor means includes a shut-off valve mounted in the inner region of the conducting means for movement between an opened and closed position, spring means for yieldably biasing the shut-off valve to an opened position away from the valve seat, and control means for moving the shut-off valve against the spring means to engage its valve seat to close the venting aperture in response to immersion of a portion of the control means positioned in one of the fuel tank and the conducting means in liquid fuel.

19. An apparatus for recovering fuel vapors discharged from a vehicle fuel system during refueling, the vehicle fuel system including a fuel tank and canister means for processing fuel vapor, the apparatus comprising means for conducting fuel vapor between the fuel tank and the canister means, valve means for normally blocking flow of fuel vapor through the conducting means, the valve means including one portion exposed to fuel vapor conducted by the conducting means and a remaining portion, the valve means being movable relative to the conducting means between a flow-blocking position and flow-delivering positions in response to exposure of the valve means to a differential pressure created by differing magnitudes of pressure communicated to the one portion and the remaining portion and exposure of the one portion to pressure having a magnitude in excess of a predetermined threshold level, the valve means dividing the conducting means upon movement of the valve means to its flow-blocking position into an inner region communicating with the fuel tank and an outer region communicating with the canister means, first passageway means for establishing communication of pressurized fuel vapor in the fuel tank with the remaining portion of the valve means, means for selectively venting fuel vapor in the first passageway means to the atmosphere to lower the magnitude of pressure communicated to the remaining portion of the valve means by the passageway means relative to the magnitude of pressure communicated to the one portion of the valve means by the conducting means to establish the differential pressure so that a movement-inducing load resulting from the pressure communicated to the one portion having a magnitude in excess of the predetermined threshold level is applied to move the valve means to a flow-delivering position, and second passageway means for communicating fuel vapor from the first passageway means to the inner region of the conducting means while the valve means is in its flow-blocking position, the valve means being formed to include the second passageway means.

20. The apparatus of claim 19, further comprising overfill sensor means in the inner region for blocking flow of liquid fuel and fuel vapor from the fuel tank to the canister means through the conducting means upon accumulation of a predetermined volume of liquid fuel in the fuel tank in excess of a predetermined threshold level, the overfill sensor means including a shut-off valve mounted in the inner region for movement between an opened and closed position and control means for moving the shut-off valve to its closed position upon accumulation of said predetermined volume of liquid fuel in the fuel tank, the second passageway means being configured to communicate pressurized fuel vapor from the first passageway means to the overfill sensor means to that such pressurized fuel vapor is permitted to apply a force to the shut-off valve in opposition to force generated by the control means causing the shut-off valve to move from its closed position to its opened position.

21. An apparatus for recovering fuel vapors discharged from a vehicle fuel system during refueling, the vehicle fuel system including a fuel tank and canister means for processing fuel vapor, the apparatus comprising means for conducting fuel vapor between the fuel tank and the canister means, first valve means for selectively blocking flow of fuel vapor through the conducting means, the first valve means being movable between a flow-blocking position and flow-delivery positions, venting control chamber means for containing fuel vapor in a predetermined region communicating with the first valve means and permitting fuel vapor to exert a closing force on the first valve means causing the valve means to move to its flow-blocking position, thereby blocking discharge of fuel vapor in the fuel tank to the canister means via the conducting means, the venting control chamber means being formed to include aperture means for admitting ambient air or the like into the control chamber means and closure means for selectively unblocking the aperture means to vent pressurized fuel vapor to the atmosphere through the aperture means, thereby lowering the pressure in the venting control chamber means, the conducting means including passageway means interconnecting the fuel tank and the first valve means in fluid communication for using fuel vapor in the fuel tank to exert an opening force on the first valve means causing the first valve means to move to its flow-delivering position upon operation of the closure means to unblock the aperture means, second valve means for selectively blocking flow of liquid fuel and fuel vapor from the fuel tank to the canister means through the passageway means, the second valve means being movable between flow-blocking and flow-delivery positions, the first and second valve means cooperating with the passageway means to define an enclosed chamber in the passageway means upon movement of each of the first and second valve means to its flow-blocking position, and means for communicating fuel vapor from the venting control chamber means to the enclosed chamber while the first valve means is in its flow-blocking position so that pressurized fuel vapor is introduced into the enclosed chamber to apply force acting to move the second valve means toward its flow-delivery position.

22. The apparatus of claim 21, wherein the first valve means is formed to include the communicating means.

23. The apparatus of claim 21, further comprising means for regulating flow of fuel vapor through the communicating means.

* * * * *